United States Patent
Yu et al.

(10) Patent No.: US 12,261,745 B2
(45) Date of Patent: Mar. 25, 2025

(54) COMMUNICATION PORT MANAGEMENT METHOD AND RELATED DEVICE

(71) Applicant: HUAWEI TECHNOLOGIES CO., LTD., Guangdong (CN)

(72) Inventors: Yang Yu, Dongguan (CN); Qinxian Lin, Dongguan (CN); Yida Wen, Leuven (BE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/485,768

(22) Filed: Oct. 12, 2023

(65) Prior Publication Data

US 2024/0048444 A1 Feb. 8, 2024

Related U.S. Application Data

(63) Continuation of application No. PCT/CN2022/071537, filed on Jan. 12, 2022.

(30) Foreign Application Priority Data

Apr. 17, 2021 (CN) .......................... 202110414998.X

(51) Int. Cl.
*G06F 15/16* (2006.01)
*H04L 41/084* (2022.01)
*H04Q 11/00* (2006.01)

(52) U.S. Cl.
CPC ....... *H04L 41/084* (2013.01); *H04Q 11/0062* (2013.01); *H04Q 2011/0079* (2013.01)

(58) Field of Classification Search
CPC .................................................. H04L 41/084
See application file for complete search history.

(56) References Cited

U.S. PATENT DOCUMENTS

2021/0374406 A1* 12/2021 Brun ................. G06F 16/24569

FOREIGN PATENT DOCUMENTS

CN 111222489 A * 6/2020

OTHER PUBLICATIONS

Extended European Search Report in European Appln No. 22787221.5, dated Aug. 6, 2024, 6 pages.

* cited by examiner

*Primary Examiner* — Padma Mundur
(74) *Attorney, Agent, or Firm* — Fish & Richardson P.C.

(57) ABSTRACT

Embodiments of this application disclose example communication port management methods and example related devices to manage a plurality of communication ports on a communication device connection panel. One example method includes obtaining at least two local images of the communication device connection panel, where each local image corresponds to one local area of the communication device connection panel, and where each of the plurality of communication ports is attached with a port label that identifies each communication port. An overall port information matrix of the communication device connection panel is generated based on the at least two local images, where the overall port information matrix indicates a port identifier of each communication port in the plurality of communication ports and a relative location of each communication port in an overall area of the communication device connection panel. Communication port management is performed based on the overall port information matrix.

20 Claims, 7 Drawing Sheets

COMMUNICATION PORT MANAGEMENT METHOD AND RELATED DEVICE

CROSS-REFERENCE TO RELATED APPLICATIONS

This application is a continuation of International Application No. PCT/CN2022/071537, filed on Jan. 12, 2022, which claims priority to Chinese Patent Application No. 202110414998.X, filed on Apr. 17, 2021. The disclosures of the aforementioned applications are hereby incorporated by reference in their entireties.

TECHNICAL FIELD

This application relates to the field of communication technologies, and in particular, to a communication port management method and a related device.

BACKGROUND

In an optical distribution network (ODN), a passive device such as an optical distribution frame (ODF) or an optical distribution terminal (FDT) with a high-density layout of optical fibers requires information management of port resources. However, communication ports in an optical fiber subrack have a small size and high distribution density, and are attached with a port label with a small size. Therefore, in such a high-density environment with complex optical fibers, a relative location and a port identifier of each communication port on the optical fiber subrack cannot be accurately identified, which affects efficiency of communication port management.

SUMMARY

Embodiments of this application provide a communication port management method and a related device, to improve accuracy of communication port positioning and improve efficiency of communication port management.

According to a first aspect, an embodiment of this application provides a communication port management method, which may be applied to an electronic device or a component in an electronic device, for example, a chip or a processor, and is configured to manage a plurality of communication ports on a communication device connection panel, where each of the plurality of communication ports is attached with a port label that identifies each communication port, and the method includes: obtaining at least two local images of the communication device connection panel, where each local image corresponds to one local area of the communication device connection panel; generating an overall port information matrix of the communication device connection panel based on the at least two local images, where the overall port information matrix indicates a port identifier of each communication port in the plurality of communication ports and a relative location of each communication port in an overall area of the communication device connection panel; and performing communication port management based on the overall port information matrix. Shooting the local area in the communication device connection panel improves definition of the local image, so that when the overall port information matrix of the communication device connection panel is generated based on the local image, accuracy of communication port identification is improved. Through the overall port information matrix, the communication ports on the communication device connection panel are managed, and efficiency of the communication port management is improved.

In a possible design, a corresponding local port information matrix for each local image is generated, to obtain at least two local port information matrices, where each local port information matrix indicates a port identifier of each communication port in a corresponding local area and a relative location of each communication port in the corresponding local area; and the overall port information matrix is obtained based on the at least two local port information matrices. Information fusion is performed on the local port information matrix to obtain the overall port information matrix, so that a communication port in an overall area is identified by using a plurality of local areas, and accuracy of information processing is improved.

In another possible design, a relative location of each local area is determined, where the relative location of each local area is a relative location of a local area corresponding to each port information matrix in the communication device connection panel; and the relative location of each communication port in the overall area of the communication device connection panel is determined based on the relative location of each local area and the relative location of each communication port in the local area corresponding to each port information matrix. The relative location of each communication port in the overall area is determined based on the relative location of each local area and the relative location of each communication port in the local area, thereby improving accuracy of communication port positioning.

In another possible design, the relative location of each local area is determined based on a relative location that is of each local image and that is entered by a user. The relative location of the local area is determined based on the relative location of each local image, and the relative location of each communication port in the overall area is further determined, thereby improving accuracy of communication port positioning.

In another possible design, the relative location of each local area is determined based on identification information of the at least one characteristic mark. The relative location of each local area is determined by using the identification information of the characteristic mark, and the relative location of each communication port in the overall area is further determined, thereby improving accuracy of communication port positioning.

In another possible design, the relative location of each local area is determined based on a relative location that is of the at least one characteristic mark in the overall area and that is entered by a user. The relative location of each local area is determined by using the relative location of the characteristic mark in the overall area, and the relative location of each communication port in the overall area is further determined, thereby improving accuracy of communication port positioning.

In another possible design, the relative location of each local area is determined based on an arrangement characteristic of a port identifier in each local port information matrix. The relative location of each local area is determined by using the arrangement characteristic of the port identifier in the local port information matrix, and the relative location of each communication port in the overall area is further determined, thereby improving accuracy of communication port positioning.

In another possible design, an overlapping area exists between a local area corresponding to a first local image and a local area corresponding to a second local image in the at least two local images.

In another possible design, port identifiers of repeated communication ports in the at least two local port information matrices and relative locations of the repeated communication ports in the overall area of the communication device connection panel are removed. Removing repeated information ensures accuracy of the overall port information matrix synthesized by using the at least two local port information matrices.

In another possible design, a plurality of frames of preview images of the communication device connection panel are obtained; and when the characteristic mark is detected, one local image in which the characteristic mark can be recognized is selected from the plurality of frames of preview images. The local area is divided by using the characteristic mark, to ensure effect of the shot local image.

In another possible design, imaging quality of the plurality of frames of preview images is determined in a process of shooting the communication device connection panel; and prompt information is displayed based on the imaging quality, where the prompt information prompts the user to control a shooting speed and a shooting distance. The imaging quality is analyzed to prompt the user, to ensure the effect of the shot local image.

In another possible design, a plurality of local images are shot for each local area; and one first local image whose definition is greater than a preset threshold is selected from the plurality of local images.

The local image whose definition is greater than the preset threshold is selected for recognition, to ensure image recognition accuracy.

In another possible design, a second local image is reselected from the plurality of local images; a corresponding local port information matrix is regenerated based on the second local image; and a port identifier of a communication port that fails to be identified in a corresponding local port information matrix generated based on the first local image and a relative location of the communication port in a corresponding local area are filled based on the regenerated local port information matrix. Performing blind compensation on the local port information matrix implements identifying all communication ports in the local area, thereby improving accuracy of communication port positioning.

In another possible design, prompt information is displayed, where the prompt information prompts the user to reshoot a second local image; a second local image is reshot for the local area corresponding to the first local image; a corresponding local port information matrix is regenerated based on the second local image; and a port identifier of a communication port that fails to be identified in a corresponding local port information matrix generated based on the first local image and a relative location of the communication port in a corresponding local area are filled based on the regenerated local port information matrix. Performing blind compensation on the local port information matrix implements identifying all communication ports in the local area, thereby improving accuracy of communication port positioning.

In another possible design, a relative location of the to-be-found communication port in the communication device connection panel is presented based on a port identifier of a to-be-found communication port and the overall port information matrix. The presented relative location of the to-be-found communication port in the communication device connection panel is used to implement management of the communication port, and improves efficiency of communication port management.

In another possible design, the to-be-found communication port is an idle communication port, and the to-be-found communication port is identified as an idle communication port in the overall port information matrix. In this way, the user determines a relative location of the idle communication port in the overall area based on the identified idle communication port, thereby quickly finding out the idle communication port.

In another possible design, the relative location of each communication port in the overall area of the communication device connection panel includes row location information and column location information in the overall area of the communication device connection panel.

According to a second aspect, an embodiment of this application provides a communication port management method. The method may be applied to an electronic device or a component in an electronic device, for example, a chip or a processor, and is used to search a communication device connection panel for a communication port, where each communication port on the communication device connection panel is attached with a port label that identifies each communication port, and includes: obtaining one local image of the communication device connection panel, where the local image corresponds to one local area of the communication device connection panel; generating a corresponding local port information matrix based on the local image, where the local port information matrix indicates a port identifier of each communication port in the local area and a relative location of each communication port in the local area; and presenting a relative location of a to-be-found communication port in the local area based on a port identifier of the to-be-found communication port and the local port information matrix. Shooting the local area in the communication device connection panel improves definition of the local image, so that when the local port information matrix is generated based on the local image, accuracy of communication port identification is improved, thereby improving accuracy of searching for a communication port and improving efficiency of communication port management. Moreover, information processing amount can be reduced by locating the communication port by using the local image.

In another possible design, a relative location of a communication port whose port identifier is the same as the port identifier of the to-be-found communication port in the local port information matrix is presented in the local area. The presented the relative location of the to-be-found communication port in the local area is used to implement management of the to-be-found communication port, and improve efficiency of communication port management.

In another possible design, a port identifier of each communication port in the local port information matrix is compared with a port identifier of the to-be-found communication port; and if a port identifier of a communication port in the local port information matrix is the same as the port identifier of the to-be-found communication port, it is determined that the relative location of the to-be-found communication port in the local area is a relative location of the communication port in the local port information matrix in the local area; and the relative location of the to-be-found communication port in the local area is presented. The relative location of the to-be-found communication port in the local area is accurately obtained by comparing the port identifier of the to-be-found communication port with the port identifier in the local port information matrix.

In another possible design, the port identifier of the to-be-found communication port is obtained by scanning a port label of the to-be-found communication port on another communication device connection panel.

In another possible design, one local image is shot for the local area based on the characteristic mark on the communication device connection panel. The local area is divided by using the characteristic mark, to ensure effect of the shot local image.

In another possible design, the relative location of the to-be-found communication port in the local area includes column location information and row location information in the local area. Optionally, the column location information is determined based on location information of the characteristic mark in the local area, and the row location information is determined based on a distance from a first row communication port in the local area.

In another possible design, the relative location of the to-be-found communication port in the local area is presented in a highlighting manner, to remind the user to find the to-be-found communication port in the local area based on the relative location of the to-be-found communication port in the local area.

According to a third aspect, an embodiment of this application provides a communication port management apparatus, configured to manage a plurality of communication ports on a communication device connection panel, where each of the plurality of communication ports is attached with a port label that identifies each communication port, and the apparatus includes: an obtaining module, configured to obtain at least two local images of the communication device connection panel, where each local image corresponds to one local area of the communication device connection panel; and a processing module, configured to: generate an overall port information matrix of the communication device connection panel based on the at least two local images, where the overall port information matrix indicates a port identifier of each communication port in the plurality of communication ports and a relative location of each communication port in an overall area of the communication device connection panel; and perform communication port management based on the overall port information matrix.

In another possible design, the processing module is further configured to: generate a corresponding local port information matrix for each local image, to obtain at least two local port information matrices, where each local port information matrix indicates a port identifier of each communication port in a corresponding local area and a relative location of each communication port in the corresponding local area; and obtain the overall port information matrix based on the at least two local port information matrices.

In another possible design, the processing module is further configured to: determine a relative location of each local area, where the relative location of each local area is a relative location of a local area corresponding to each port information matrix in the communication device connection panel; and determine the relative location of each communication port in the overall area of the communication device connection panel based on the relative location of each local area and the relative location of each communication port in the local area corresponding to each port information matrix.

In another possible design, the processing module is further configured to determine the relative location of each local area based on a relative location that is of each local image and that is entered by a user.

In another possible design, the communication device connection panel is attached with at least one characteristic mark; and the processing module is further configured to determine the relative location of each local area based on identification information of the at least one characteristic mark.

In another possible design, the communication device connection panel is attached with at least one characteristic mark; and the processing module is further configured to determine the relative location of each local area based on a relative location that is of the at least one characteristic mark in the overall area and that is entered by a user.

In another possible design, the processing module is further configured to determine the relative location of each local area based on an arrangement characteristic of a port identifier in each local port information matrix.

In another possible design, an overlapping area exists between a local area corresponding to a first local image and a local area corresponding to a second local image in the at least two local images.

In another possible design, the processing module is further configured to remove port identifiers of repeated communication ports in the at least two local port information matrices and relative locations of the repeated communication ports in the overall area of the communication device connection panel.

In another possible design, the obtaining module is further configured to obtain a plurality of frames of preview images of the communication device connection panel; and the processing module is further configured to: when the characteristic mark is detected, select, from the plurality of frames of preview images, one local image in which the characteristic mark can be recognized.

In another possible design, the processing module is further configured to: determine imaging quality of the plurality of frames of preview images in a process of shooting the communication device connection panel; and display prompt information based on the imaging quality, where the prompt information prompts a user to control a shooting speed and a shooting distance.

In another possible design, the processing module is further configured to shoot a plurality of local images for each local area; and select, from the plurality of local images, one local image whose definition is greater than a preset threshold.

In another possible design, the display module is further configured to present a relative location of a to-be-found communication port in the communication device connection panel based on a port identifier of the to-be-found communication port and the overall port information matrix.

In another possible design, the to-be-found communication port is an idle communication port, and the processing module is further configured to identify the to-be-found communication port as an idle communication port in the overall port information matrix.

In another possible design, the relative location of each communication port in the overall area of the communication device connection panel includes row location information and column location information of each communication port in the overall area of the communication device connection panel.

In another possible design, the processing module is further configured to: reselect a second local image from the plurality of local images; regenerate a corresponding local port information matrix based on the second local image;

and fill, based on the regenerated local port information matrix, a port identifier of a communication port that fails to be identified in a corresponding local port information matrix generated based on the first local image and a relative location of the communication port in a corresponding local area.

In another possible design, the display module is configured to display prompt information, where the prompt information prompts the user to reshoot a second local image; and the processing module is further configured to: re-shoot a second local image for the local area corresponding to the first local image; regenerate a corresponding local port information matrix based on the second local image; and fill, based on the regenerated local port information matrix, a port identifier of a communication port that fails to be identified in a corresponding local port information matrix generated based on the first local image and a relative location of the communication port in a corresponding local area.

For operations and beneficial effects performed in the third aspect and various possible designs in the third aspect, refer to operations and beneficial effects performed in the first aspect and various possible designs in the first aspect. Details are not described herein again.

According to a fourth aspect, an embodiment of this application provides a communication port management apparatus, configured to search for a communication port on a communication device connection panel, where each communication port on the communication device connection panel is attached with a port label that identifies each communication port, and the apparatus includes: an obtaining module, configured to obtain one local image of the communication device connection panel, where the local image corresponds to one local area of the communication device connection panel; a processing module, configured to generate a corresponding local port information matrix based on the local image, where the local port information matrix indicates a port identifier of each communication port in the local area and a relative location of each communication port in the local area; and a display module, configured to present a relative location of a to-be-found communication port in the local area based on a port identifier of the to-be-found communication port and the local port information matrix.

In a possible design, the display module is further configured to present a relative location, in the local area, of a communication port whose port identifier is the same as the port identifier of the to-be-found communication port in the local port information matrix.

In another possible design, the obtaining module is further configured to obtain the port identifier of the to-be-found communication port by scanning a port label of the to-be-found communication port on another communication device connection panel.

In another possible design, the communication device connection panel is attached with at least one characteristic mark; and the obtaining module is further configured to shoot one local image for the local area based on the characteristic mark on the communication device connection panel.

In another possible design, the relative location of the to-be-found communication port in the local area includes column location information and row location information in the local area.

In another possible design, the display module is further configured to present the relative location of the to-be-found communication port in the local area in a highlighting manner.

For operations and beneficial effects performed in the fourth aspect and various possible designs in the fourth aspect, refer to operations and beneficial effects performed in the second aspect and various possible designs in the second aspect. Details are not described herein again.

According to a fifth aspect, this application provides a communication port management apparatus. The apparatus may be an electronic device, may be an apparatus in an electronic device, or may be an apparatus that can be used in matching with the electronic device. Alternatively, the communication port management apparatus may be a chip system. The communication port management apparatus may perform the methods in the first aspect and the second aspect. A function of the communication port management apparatus may be implemented by hardware, or may be implemented by hardware executing corresponding software. The hardware or the software includes one or more modules corresponding to the function. The module may be software and/or hardware. For operations and beneficial effects performed by the communication port management apparatus, refer to the methods and beneficial effects in the first aspect and the second aspect. Repeated parts are not described again.

According to a sixth aspect, this application provides a communication port management apparatus, where the communication port management apparatus includes a processor, and when the processor invokes a computer program in a memory, the method according to any one of the first aspect and the second aspect is performed.

According to a seventh aspect, this application provides a communication port management apparatus, where the communication port management apparatus includes a processor and a memory, and the memory is configured to store a computer program; and the processor is configured to execute the computer program stored in the memory, so that the communication port management apparatus performs the method according to any one of the first aspect and the second aspect.

According to an eighth aspect, this application provides a communication port management apparatus, where the communication port management apparatus includes a processor, a memory, and a transceiver, and the transceiver is configured to receive a channel or a signal, or send a channel or a signal; the memory is configured to store a computer program; and the processor is configured to invoke the computer program from the memory to perform the method according to any one of the first aspect and the second aspect.

According to a ninth aspect, this application provides a communication port management apparatus, where the communication port management apparatus includes a processor and an interface circuit, and the interface circuit is configured to receive a computer program and transmit the computer program to the processor; and the processor runs the computer program to perform the method according to any one of the first aspect and the second aspect.

According to a tenth aspect, this application provides a computer-readable storage medium, where the computer-readable storage medium is configured to store a computer program, and when the computer program is executed, the method according to any one of the first aspect and the second aspect is implemented.

According to an eleventh aspect, this application provides a computer program product including a computer program. When the computer program is executed, the method according to any one of the first aspect and the second aspect is implemented.

BRIEF DESCRIPTION OF DRAWINGS

To describe technical solutions in embodiments of this application or in the background more clearly, the following describes accompanying drawings used for describing the embodiments of this application or the background.

DESCRIPTION OF EMBODIMENTS

The following describes the embodiments of this application with reference to the accompanying drawings in the embodiments of this application.

Figure 1:
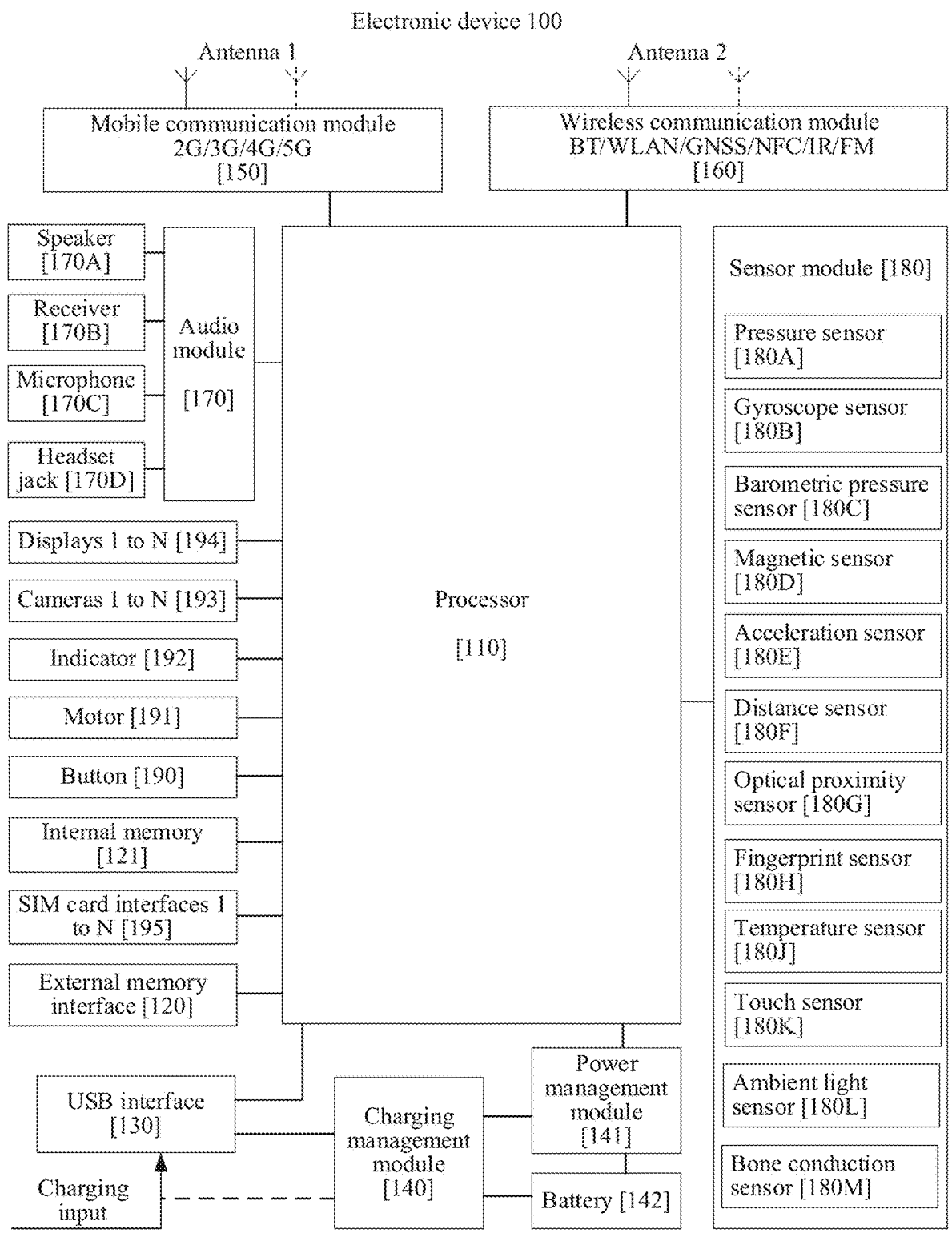
FIG. 1 is a schematic diagram of a structure of an electronic device.

FIG. 1 is a schematic diagram of a structure of an electronic device 100.

The electronic device 100 may include a processor 110, a camera 193, and a display 194.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be independent components, or may be integrated into one or more processors. The controller may be a nerve center and a command center of the electronic device 100. The controller may generate an operation control signal based on instruction operation code and a time sequence signal, to complete control of instruction reading and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor may directly invoke the instructions or the data from the memory. This avoids repeated access, reduces a waiting time of the processor 110, and improves system efficiency.

In some embodiments, the processor 110 may include one or more interfaces. The interface may include an integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) port, and/or the like.

The display 194 is configured to display an image, a video, and the like. The display 194 includes a display panel. The display panel may be a liquid crystal display (LCD), an organic light-emitting diode (OLED), an active-matrix organic light emitting diode (AMOLED), a flexible light-emitting diode (FLED), a mini LED, a micro LED, a micro-OLED, a quantum dot light emitting diode (QLED), or the like. In some embodiments, the electronic device 100 may include one or N displays 194, where N is a positive integer greater than 1.

The electronic device 100 may implement a photographing function through the camera 193, the ISP, the video codec, the GPU, the display 194, the application processor and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, and brightness of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transformation on frequency energy.

Optionally, the electronic device 100 may further include an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a subscriber identification module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like. The following describes each component.

It may be understood that the structure shown in this embodiment of this application does not constitute a specific limitation on the electronic device 100. In some other embodiments of this application, the electronic device 100 may include more or fewer components than those shown in the figure, or some components may be combined, or some components may be split, or different component arrangements may be used. The components shown in the figure may be implemented by hardware, software, or a combination of software and hardware.

It may be understood that, an interface connection relationship between the modules shown in this embodiment of this application is merely an example for description, and does not constitute a limitation on the structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charging input from a charger. The charger may be a wireless charger or a wired charger. In some embodiments of wired charging, the charging management module 140 may receive a charging input from the wired charger through the USB interface 130. In some embodiments of wireless charging, the charging management module 140 may receive a wireless charging input by using a wireless charging coil of the electronic device 100. When charging the battery 142, the charging management module 140 may further supply power to the electronic device by using the power management module 141.

The power management module 141 is configured to connect the battery 142 and the charging management module 140 to the processor 110. The power management module 141 receives an input of the battery 142 and/or an input of the charging management module 140, and supplies power to the processor 110, the internal memory 121, an external memory, the display 194, the camera 193, the wireless communication module 160, and the like. The power management module 141 may be further configured to monitor a parameter such as a battery capacity, a battery cycle count, or a battery health status (leakage and impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communications frequency bands. Different antennas may be further reused, to improve antenna utilization. For example, the antenna 1 may be multiplexed as a diversity antenna of a wireless local area network. In other embodiments, the antenna may be used in conjunction with a tuning switch.

The mobile communication module 150 may provide a wireless communication solution that is applied to the electronic device 100 and that includes 2G/3G/4G/5G. The mobile communication module 150 may include at least one filter, a switch, a power amplifier, a low noise amplifier (LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules of the mobile communication module 150 may be disposed in the processor 110. In some embodiments, at least some functional modules of the mobile communication module 150 and at least some modules of the processor 110 may be disposed in a same device.

The modem processor may include a modulator and a demodulator. In some embodiments, the modem processor may be an independent component. In some other embodiments, the modem processor may be independent of the processor 110, and is disposed in a same device as the mobile communication module 150 or another functional module.

The wireless communication module 160 may provide a wireless communication solution that includes a wireless local area network (WLAN) (for example, a wireless fidelity (Wi-Fi) network), Bluetooth (BT), a global navigation satellite system (GNSS), frequency modulation (FM), near field communication (NFC), an infrared (IR) technology, or the like and that is applied to the electronic device 100. The wireless communication module 160 may be one or more devices integrating at least one communication processing module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert a processed signal into an electromagnetic wave through the antenna 2 for radiation.

In some embodiments, in the electronic device 100, the antenna 1 and the mobile communication module 150 are coupled, and the antenna 2 and the wireless communication module 160 are coupled, so that the electronic device 100 can communicate with a network and another device by using a wireless communication technology. The wireless communication technology may include a global system for mobile communication (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The electronic device 100 may implement a display function through the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, which execute program instructions to generate or change display information.

The video codec is configured to compress or decompress a digital video. The electronic device 100 may support one or more video codecs. In this way, the electronic device 100 may play back or record videos in a plurality of coding formats, for example, moving picture experts group (MPEG)-1, MPEG-2, MPEG-3, and MPEG-4.

The NPU is a neural-network (NN) computation processor. The NPU quickly processes input information by referring to a structure of a biological neural network, for example, by referring to a mode of transmission between human brain neurons, and continuously performs self-learning. Applications such as intelligent cognition of the electronic device 100 may be implemented through the NPU, for example, image recognition, facial recognition, speech recognition, and text understanding.

The external memory interface 120 may be configured to connect to an external memory card, for example, a micro SD card, to expand a storage capability of the electronic device 100. The external memory card communicates with the processor 110 through the external memory interface 120, to implement a data storage function. For example, files such as music and a video are saved in the external storage card.

The internal memory 121 may be configured to store computer-executable program code. The executable program code includes instructions. The processor 110 runs the instructions stored in the internal memory 121, to perform various function applications of the electronic device 100 and data processing. The internal memory 121 may include a program storage area and a data storage area. The program storage area may store an operating system, an application required by at least one function (such as a sound playing function or an image playing function), and the like. The data storage area may store data (for example, audio data or a phone book) created in a process of using the electronic device 100. In addition, the internal memory 121 may include a high-speed random access memory, and may further include a nonvolatile memory, for example, at least one magnetic disk storage device, a flash storage device, a universal flash storage (UFS), and the like.

The electronic device 100 may implement an audio function, for example, music playing and recording, through the audio module 170, the speaker 170A, the receiver 170B, the microphone 170C, the headset jack 170D, the application processor, and the like.

The audio module 170 is configured to convert digital audio information into an analog audio signal for output, and is also configured to convert analog audio input into a digital audio signal. The audio module 170 may be further configured to encode and decode an audio signal. In some embodiments, the audio module 170 may be disposed in the processor 110, or some function modules of the audio module 170 are disposed in the processor 110.

The speaker 170A, also referred to as a "loudspeaker", is configured to convert an audio electrical signal into a sound signal. The electronic device 100 may be used to listen to music or answer a call in a hands-free mode over the speaker 170A.

The receiver 170B, also referred to as an "earpiece", is configured to convert an electrical audio signal into a sound signal. When a call is answered or speech information is received through the electronic device 100, the receiver 170B may be put close to a human ear to listen to a voice.

The microphone 170C, also referred to as a "mike" or a "mic", is configured to convert a sound signal into an electrical signal. When making a call or sending a voice message, a user may make a sound near the microphone 170C through the mouth of the user, to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, and identify a sound source, so as to implement a directional recording function and the like.

The headset jack 170D is configured to connect to a wired headset. The headset jack 170D may be a USB interface 130, or may be a 3.5 mm open mobile terminal platform (OMTP) standard interface or cellular telecommunications industry association of the USA (CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on the change in the capacitance. When a touch operation is performed on the display 194, the electronic device 100 detects intensity of the touch operation through the pressure sensor 180A. The electronic device 100 may also calculate a touch location based on a detection signal of the pressure sensor 180A. In some embodiments, touch operations that are performed at a same touch location but have different touch operation intensities may correspond to different operation instructions. For example, when a touch operation whose touch operation intensity is less than a first pressure threshold is performed on an SMS message application icon, an instruction for viewing an SMS message is executed. When a touch operation whose touch operation intensity is greater than or equal to the first pressure threshold is performed on the SMS message application icon, an instruction for creating a new SMS message is performed.

The gyroscope sensor 180B may be configured to determine a moving posture of the electronic device 100.

The barometric pressure sensor 180C is configured to measure barometric pressure.

The magnetic sensor 180D includes a Hall sensor.

The acceleration sensor 180E may detect accelerations in various directions (usually on three axes) of the electronic device 100. When the electronic device 100 is still, a magnitude and a direction of gravity may be detected. The acceleration sensor 180E may be further configured to identify a posture of the electronic device, and is used in an application such as conversion between a landscape mode and a portrait mode or a pedometer.

The distance sensor 180F is configured to measure a distance.

The optical proximity sensor 180G may include, for example, a light emitting diode (LED) and an optical detector, for example, a photodiode.

The ambient light sensor 180L is configured to sense ambient light brightness.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy through the temperature detected by the temperature sensor 180J.

The touch sensor 180K is also referred to as a "touch panel". The touch sensor 180K may be disposed on the display 194, and the touch sensor 180K and the display 194 constitute a touchscreen, which is also referred to as a "touchscreen". The touch sensor 180K is configured to detect a touch operation performed on or near the touch sensor 180K. The touch sensor may transfer the detected touch operation to the application processor to determine a type of the touch event. A visual output related to the touch operation may be provided on the display 194. In some other embodiments, the touch sensor 180K may also be disposed on a surface of the electronic device 100 at a location different from that of the display 194.

The button 190 includes a power button, a volume button, and the like. The button 190 may be a mechanical button, or may be a touch button. The electronic device 100 may receive a button input, and generate a button signal input related to a user setting and function control of the electronic device 100.

The motor 191 may generate a vibration prompt. The motor 191 may be configured to provide an incoming call vibration prompt or a touch vibration feedback. For example, touch operations performed on different applications (for example, shooting and audio playing) may correspond to different vibration feedback effects. For touch operations performed on different areas of the display 194, the motor 191 may also correspond to different vibration feedback effects. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type or of different types. The SIM card interface 195 is compatible to different types of SIM cards. The SIM card interface 195 may also be compatible with an external storage card. The electronic device 100 interacts with a network through the SIM card, to implement functions such as conversation and data communication. In some embodiments, the electronic device 100 uses an eSIM, namely, an embedded SIM card. The eSIM card may be embedded in the electronic device 100, and cannot be separated from the electronic device 100.

The electronic device in embodiments of this application may be a mobile phone, a tablet computer, a notebook computer, an ultra-mobile personal computer (UMPC), a handheld computer, a netbook, or a personal digital assistant (PDA), a wearable electronic device, a virtual reality device, and the like. Alternatively, the electronic device may include a camera and a processing device (for example, a computer). For example, a local image is shot by using the camera, and then the processing device processes the shot local image, so as to locate the communication port.

The communication port in the fiber subrack can be positioned in the following ways. An electronic device shoots an image of a global area of an ODF, and identifies, based on the image of the global area, a relative location and a port identifier of a communication port in an overall optical fiber subrack, and if identification information is incomplete, instructs a photographer to reshoot a new image of the global area at a different angle, until all relative locations and port identifiers are obtained. However, this method has the following problems:

(1) In order to obtain an image of a global area of the optical fiber subrack, a zoom ratio of a camera needs to be adjusted during shooting, so that the image of the global area can be shot. Because an information plane supported by an array mechanical part is too small, when the electronic device is too far away from the imaging information plane, a shot image is prone to edge distortion, blur, and low definition, which increases the difficulty of parsing the port identifier. If the optical fiber subrack is flat and long, the image of the global area of the optical fiber subrack needs to be shot at a long distance. The long distance shooting causes loss of some detailed information of the image, and affects decoding efficiency of a port label on the communication port.

(2) A plurality of frames of images of the global area are shot, information fusion is performed by using the plurality of frames of images, and some frames of images are selected for processing according to a specific rule based on similarity between the plurality of frames of images. However, images based on some frames may not be accurately identified, and an amount of image processing is increased. When recognition results of the images based on some frames are fused, if a difference occurs in positioning of some areas in the images based on some frames, it is difficult to correctly determine a location of the communication port, and accuracy of positioning of the communication port is affected.

(3) The image of the global area covers all communication ports. Because of small size and high distribution density of communication ports in the optical fiber subrack, a positioning error of column and column location information of the communication ports is likely to occur.

(4) When a photographer is instructed to switch an angle to perform shooting, some local areas may be affected by a plurality of factors such as illumination, which affects contour detection of the communication port in the optical fiber subrack and parsing of the port label. In addition, this shooting manner is easily affected by a subrack type and external factors, and a processing process is complex and a calculation amount is large. A function of "blind compensation" at fixed points cannot be completed.

In addition, an optical fiber needs to be connected between an optical splitter and a user side during fiber-to-the-home. The optical path of the optical fiber is as follows:

optical splitter side->user side. If the user side exits a network, an operator removes one end of the optical fiber connected to the user side. Because one end of the optical fiber is directly connected to the user side, a communication port in the optical fiber subrack to which one end of the optical fiber is connected can be determined. However, for the optical splitter side, which communication port of the optical splitter to which the other end of the optical fiber is connected cannot be accurately positioned, resulting in difficult communication port management.

To resolve the foregoing technical problems, embodiments of this application provide the following solutions.

Figure 2:
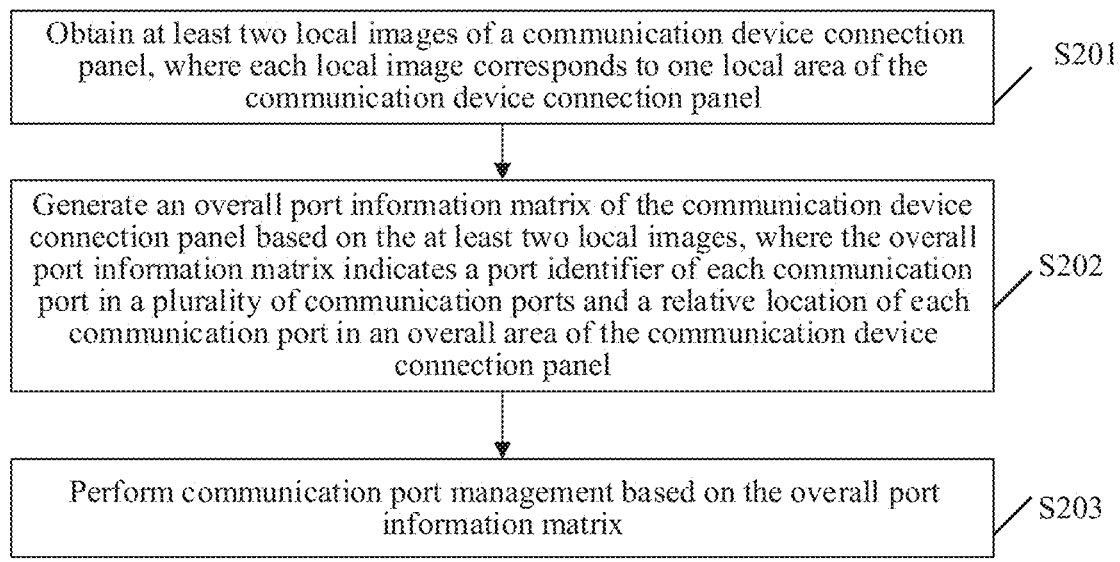
FIG. 2 is a schematic flowchart of a communication port management method according to an embodiment of this application.

As shown in FIG. 2, FIG. 2 is a schematic flowchart of a communication port management method according to an embodiment of this application. Steps in this embodiment of this application include at least the following steps.

S201: An electronic device obtains at least two local images of a communication device connection panel, where each local image corresponds to one local area of the communication device connection panel.

Figure 3:
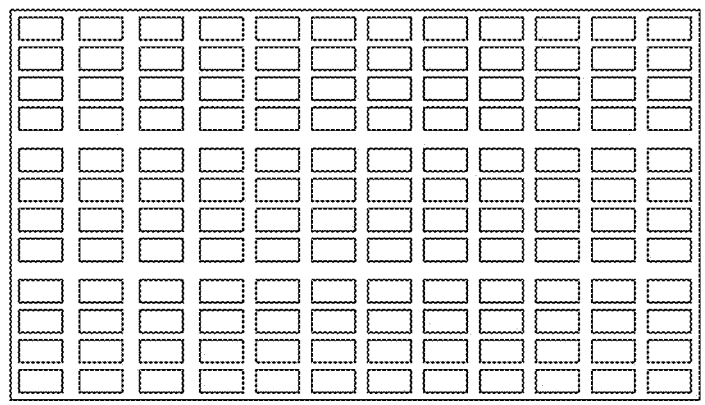
FIG. 3 is a schematic diagram of an optical fiber subrack according to an embodiment of this application.

The communication device connection panel may be an optical fiber subrack, and the optical fiber subrack may include M rows*N columns of communication ports. Both M and N are positive integers. For example, as shown in FIG. 3, FIG. 3 is a schematic diagram of an optical fiber subrack according to an embodiment of this application. The optical fiber subrack may include 12 rows*12 columns of communication ports, and all communication ports are evenly distributed in the optical fiber subrack. Each communication port is attached with a port label that identifies each communication port. The port label may be a QR code, a bar code, a character string, machine-readable code information, or the like.

Optionally, all communication ports may alternatively be unevenly distributed in the fiber subrack. For example, a first row of the fiber subrack includes 10 communication ports, and a second row to a twelfth row each include 12 communication ports. Leftmost and rightmost sides of a second row to the twelfth row are one more communication port than the first row. The communication ports may alternatively be distributed in the optical fiber subrack in another manner, and details are not described herein again.

Optionally, if there is no obvious characteristic information on the communication device connection panel, for example, row/column number information (for example, A1, B2, and C3) identified by an edge of the communication device connection panel, a user can add a characteristic mark on the communication device connection panel, and fasten the characteristic mark to an edge area of the communication device connection panel by pasting or nesting. For example, a characteristic mark may be fastened to a location above the first row of communication ports, or a location below the last row of communication ports in the communication device connection panel. The characteristic mark may be different types of identification information, for example, different patterns, different color blocks, or different letters. Different local areas on the communication device connection panel can be distinguished by setting characteristic marks.

Figure 4:
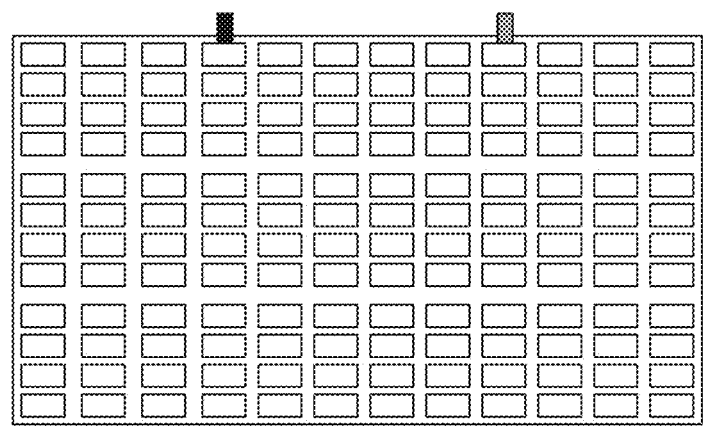
FIG. 4 is a schematic diagram of another optical fiber subrack according to an embodiment of this application.

For example, as shown in FIG. 4, one characteristic mark is separately disposed in upper areas of the first row of a fourth column and a ninth column of the optical fiber subrack, and colors of characteristic marks in the fourth column and the characteristic mark in the ninth column are different. Communication ports in the first column to the fourth column are divided into a first local area by using characteristic marks, communication ports in the fourth column to the ninth column are divided into a second local area, and communication ports in the ninth column to the twelfth column are divided into a third local area. Overlapping areas exist between the foregoing local areas. Alternatively, local areas may be divided in another manner. For example, communication ports in the first column to the fourth column are divided into a first local area, communication ports in a fifth column to the ninth column are divided into a second local area, and communication ports in a tenth column to the twelfth column are divided into a third local area. No overlapping area exists between the foregoing local areas. If there are obvious characteristic marks on the communication device connection panel, local areas can be distinguished by using the characteristic marks on the communication device connection panel.

Figure 5:
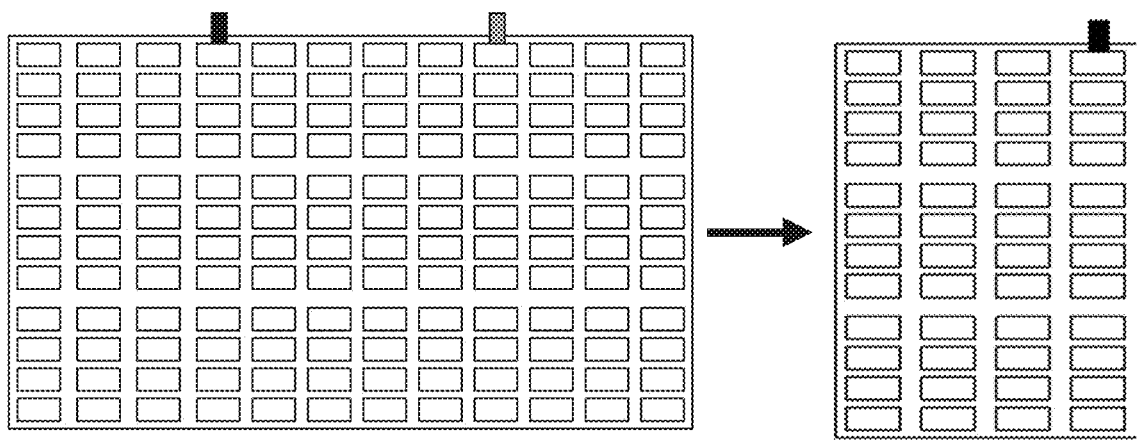
FIG. 5 is a schematic diagram of another local area according to an embodiment of this application.

Optionally, the user may scan and shoot the communication device connection panel by using an electronic device, and obtain a plurality of frames of preview images of the communication device connection panel for each local area. When the characteristic mark is detected, one local image in which the characteristic mark can be recognized is selected from the plurality of frames of preview images. For example, as shown in FIG. 5, a camera is used to scan and shoot the optical fiber subrack shown in FIG. 4 from left to right. When an electronic device scans communication ports in the fourth column, it is detected that a characteristic mark exists in the fourth column. It is determined that communication ports in the first column to the fourth column in the fiber subrack are the first local area, and the electronic device may select one local image from the obtained plurality of frames of preview images. When the electronic device scans communication ports in the ninth column, it is detected that a characteristic mark exists in both the fourth column and the ninth column, and it is determined that the communication ports in the fourth column to the ninth column are the second local area. The electronic device may select another local image from the obtained plurality of frames of preview images, and the like.

Optionally, before shooting the communication device connection panel, the user may enter, to the electronic device, a relative location of each characteristic mark in an entire area corresponding to the communication device connection panel. When the electronic device scans and shoots the communication device connection panel, the electronic device may obtain at least two local images based on relative locations of characteristic marks in the entire area, and record the relative location of the characteristic marks corresponding to each local image. For example, the optical fiber subrack shown in FIG. 4 is scanned from left to right. When the electronic device scans communication ports in the fourth column, because the electronic device learns in advance that a first characteristic mark is located in the fourth column of the communication device connection panel, a local area image is shot for a local area of the first column to the fourth column. When the communication port in the ninth column is obtained by scanning, because it is learned in advance that a second characteristic mark is located in the ninth column of the communication device connection panel, another local area picture is shot for a local area of the fourth column to the ninth column, and the like.

Optionally, the user may separately shoot at least two local images based on a plurality of different shooting angles. A local image is shot for each local area. For example, for the optical fiber subrack shown in FIG. 4, the user divides the optical fiber subrack into three local areas based on characteristic marks, and adjusts a shooting angle of the camera of the electronic device, so that the electronic device is aligned with communication ports of the first column to the fourth column, and shoots a local image. Then, the electronic device is aligned with the communication ports in the fourth column to the ninth column, and then shoots a local image. Finally, the electronic device is aligned with the communication ports in the ninth column to the twelfth column, and then shoots a local image.

An overlapping area exists between a local area corresponding to a first local image and a local area corresponding to a second local image in the at least two local images, and the local area corresponding to the first local image and the local area corresponding to the second local image are two adjacent local areas. For example, for the fiber subrack shown in FIG. 4, the communication ports in the fourth column are an overlapping area between the first local area and the second local area, and the communication ports in the ninth column is an overlapping area between the second local area and the third local area. Optionally, in the at least two local images, there is no overlapping area between the local area corresponding to the first local image and the local area corresponding to the second local image. For example, a first local image may be shot for the communication ports in the first column to the fourth column, a second local image may be shot for communication ports in the fifth column to an eighth column, and a third local image may be shot for communication ports in the ninth column to the twelfth column. Optionally, if there is no characteristic mark on the communication device connection panel, the user may first divide the communication device connection panel into at least two local areas, and then align the camera with each local area to shoot a local image. For example, a fiber subrack includes 4 columns*8 rows of communication ports. Communications ports in a first row to a fourth row may be used as a local area, a local image may be shot by aligning the camera with the local area, and then communication ports in a fifth row to an eighth row are used as a local area, another local image may be shot by aligning the camera with the local area.

Optionally, the user may input a relative location of each local image to the electronic device, where the relative location may be an order identifier. For example, the optical fiber subrack shown in FIG. 4 is scanned from left to right. For the communication ports of the first column to the fourth column, the corresponding local image may be recorded as 1. For the communication ports in the fifth column to the eighth column, the corresponding local image may be recorded as 2. For the communication ports in columns 9 to 12, the corresponding local image may be recorded as 3.

Optionally, during the process of shooting the communication device connection panel, the plurality of frames of preview images may be analyzed in real time to determine the imaging quality of the plurality of frames of preview images; and prompt information is displayed based on the imaging quality, where the prompt information prompts the user to control a shooting speed and a shooting distance. The imaging quality may be definition, an imaging area, or the like.

For example, in a process of shooting a communication device connection panel by using an electronic device, a user analyzes a preview image to determine definition or an imaging area of the preview image. If definition of one or more frames of preview images is less than a first preset threshold, the user is prompted to adjust a shooting angle or reduce a moving speed of the electronic device. Alternatively, if an imaging area of one or more frames of preview images is less than a second preset threshold or greater than a third preset threshold, the user is prompted to adjust a distance between the electronic device and the communication device connection panel, so that the imaging area of the shot local images matches the local area.

Optionally, a plurality of local images are shot for each local area. One first local image whose definition is greater than a preset threshold is selected from the plurality of local images as one of the at least two local images. For example, for the optical fiber subrack shown in FIG. 4, for a local area of the first column to the fourth column, a plurality of local images may be shot, and then one of the plurality of local images with highest definition is selected. Alternatively, any one of the plurality of local images whose definition is greater than the preset threshold may be selected. Then, a plurality of local images are shot for the local area of the fifth column to the ninth column, and then one of the plurality of local images with highest definition is selected. Alternatively, any one of the plurality of local images whose definition is greater than the preset threshold may be selected. Another local area may also be processed in a same manner, and details are not described herein again.

S202: The electronic device generates an overall port information matrix of the communication device connection panel based on the at least two local images, where the overall port information matrix indicates a port identifier of each communication port in the plurality of communication ports and a relative location of each communication port in an overall area of the communication device connection panel.

First, each local image may be identified for each local image, and a corresponding local port information matrix is generated, to obtain at least two local port information matrices, where each local port information matrix indicates a port identifier of each communication port in a corresponding local area and a relative location of each communication port in the corresponding local area. The relative location in the local area is a location of the communication port relative to an original point in the local area, and the origin may be an upper left corner, an upper right corner, a lower left corner, a lower right corner, or a center in the local area, or a characteristic mark in the local area.

For example, for the optical fiber subrack shown in FIG. 4, the local area of the first column to the fourth column is shot to obtain a first local image. Because each communication port is attached with a port label, a port identifier of each communication port in the first local image may be obtained by identifying a port identifier of each communication port. Then, a relative location of each communication port in the local area in the local area is determined by using an origin in the local area corresponding to the first local image as a reference point. For example, an upper left corner in the local area is used as an origin, a communication port in a first row and a first column may be recorded as (1, 1), a communication port in a second row and a first column may be recorded as (2, 1), and a communication port in row 3 and column 1 can be recorded as (3, 1), . . . , and so on. A relative location of each communication port in the local area corresponding to the first local image is recorded, and a first local port information matrix is generated based on a port identifier of each communication port and the relative location of each communication port in the corresponding local area. Then, the local area of the fourth column to the ninth column are shot to obtain a second local image. A port identifier of each communication port in the second local image is obtained by identifying a port label of each communication port, and an upper left corner in the local area corresponding to the second local image is used as an origin. The relative location of each communication port is determined in the foregoing manner, and the second local port information matrix is generated based on the port identifier of each communication port and the relative location of each communication port in the corresponding local area. The third local port information matrix is generated by analogy.

It should be noted that, if the communication ports are not evenly distributed on the communication device connection panel, for example, a location on the communication device connection panel has no communication port, and a port identifier and a relative location corresponding to the location in a local port information matrix may be configured to 0. For example, leftmost and rightmost of a second row to a twelfth row in the optical fiber subrack respectively have one more communication port than the first row, that is, the first row and the first column, and the first row and the twelfth column have no communication port. Port identifiers and relative locations corresponding to the first row, the first column, and the first row, the twelfth column in a local port information matrix may be configured to 0.

Optionally, a port label of each communication port in a corresponding local area may not be fully identified based on one local image. If the local port information matrix lacks port identifiers of some communication ports and relative locations of the port identifiers in the corresponding local area, a second local image may be selected from the plurality of local images (shot for a same local area). Then, a corresponding local port information matrix is regenerated based on the second local image. A port identifier of a communication port that fails to be identified in a corresponding local port information matrix generated based on the first local image and a relative location of the communication port in a corresponding local area are filled based on the regenerated local port information matrix.

Optionally, if the local port information matrix does not contain port identifiers of some communication ports and relative locations of some communication ports in the corresponding local area, prompt information may be displayed, where the prompt information prompts the user to reshoot a second local image. The second local image is reshot for the local area corresponding to the first local image. A corresponding local port information matrix is regenerated based on the second local image. A port identifier of a communication port that fails to be identified in a corresponding local port information matrix generated based on the first local image and a relative location of the communication port in a corresponding local area are filled based on the regenerated local port information matrix.

Figure 6A:
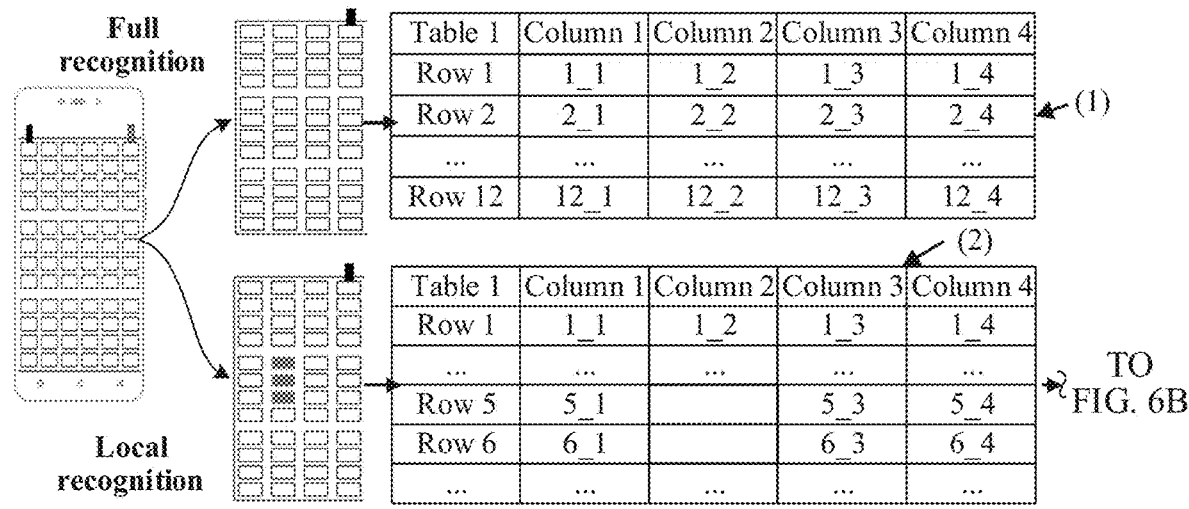
FIG. 6A and FIG. 6B are a schematic diagram of a local port information matrix according to an embodiment of this application.
Figure 6B:
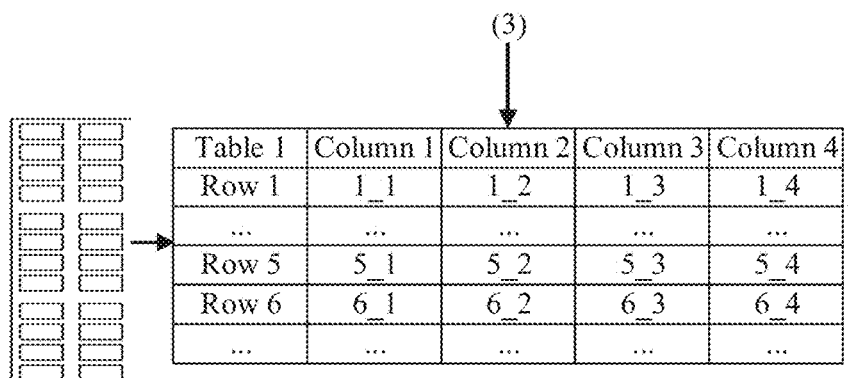

As shown in FIG. 6A and FIG. 6B, FIG. 6A and FIG. 6B are a schematic diagram of a local port information matrix according to an embodiment of this application. If full recognition is performed on all communication ports in a corresponding local area based on one local image, a local port information matrix (1) is generated, and each communication port corresponds to a relative location (port identifiers are not drawn). If local recognition is performed on a communication port in a corresponding local area based on one local image, a local port information matrix (2) is generated, and locations of a fifth row and a second column, and a sixth row and a second column in the local port information matrix are empty. Therefore, for the local area, a second local image may be shot again, and a corresponding local port information matrix is regenerated, to fill in missing information in the local port information matrix (2) to obtain a local port information matrix (3). If full recognition can be performed based on the reshot second local image, a local port information matrix generated by using the second local image may also be directly used.

Then, the overall port information matrix is obtained based on the at least two local port information matrices. Further, a relative location of each local area may be determined, and the relative location of each communication port in the overall area of the communication device connection panel is determined based on the relative location of each local area and the relative location of each communication port in the local area corresponding to each port information matrix. The relative location of each local area is a relative location of a local area corresponding to each port information matrix in the communication device connection panel; and the relative location of each communication port in the overall area of the communication device connection panel includes row location information and column location information in the overall area of the communication device connection panel.

The determining the relative location of each local area may include at least the following optional manners.

In a first optional manner, the relative location of each local area is determined based on a relative location that is of each local image and that is entered by a user. The relative location of each local image may be an order identifier. For example, after the optical fiber subrack shown in FIG. 4 is sequentially scanned and shot from left to right, for the communication ports in the first column to the fourth column, a corresponding local image is recorded as 1. Therefore, it is determined that a local area corresponding to the local image is located on a leftmost side of an entire area. For communication ports in the fifth column to the eighth column, a corresponding local image is recorded as 2. Therefore, it is determined that a local area corresponding to the local image is located in a middle of the entire area. For communication ports in the ninth column to the twelfth column, a corresponding local image may be recorded as 3. Therefore, it is determined that a local area corresponding to the local image is located on a rightmost side of the entire area.

In a second optional manner, the relative location of each local area is determined based on identification information of the at least one characteristic mark. The identification information may be different patterns, different color blocks, different letters, or the like.

For example, for the optical fiber subrack shown in FIG. 4, two characteristic marks on the optical fiber subrack are respectively a pattern 1 and a pattern 2. After three local images are photographed in sequence from left to right, a first local image includes the pattern 1, a second local image includes the pattern 1 and the pattern 2, and a third local image includes the pattern 2. The pattern 1 and the pattern 2 are characteristic marks of overlapping areas between the three local images. According to the characteristic marks in the three local images, it may be successively determined that a local area corresponding to the local image including the pattern 1 is located on the leftmost side of the optical fiber subrack, a local area corresponding to the local image including the pattern 1 and the pattern 2 is located in the middle of the optical fiber subrack, and a local area corresponding to the local image including the pattern 2 is located on the rightmost side of the optical fiber subrack. If there is no overlapping area between the three local images, a relative location of each local area may also be determined in the foregoing manner.

In a third optional manner, the relative location of each local area is determined based on a relative location that is of the at least one characteristic mark in the overall area and that is entered by a user.

For example, when shooting an optical fiber subrack, the user may enter a relative location of each characteristic mark in an overall area. For the optical fiber subrack shown in FIG. 4, a relative location of a first characteristic mark may be recorded as the fourth column, and a relative location of a second characteristic mark may be recorded as the ninth column. After three local images are shot, the relative location of each local area is determined based on the relative location of the characteristic mark corresponding to each local image.

In a fourth optional manner, the relative location of each local area is determined based on an arrangement characteristic of a port identifier in each local port information matrix.

For example, for the optical fiber subrack shown in FIG. 4, after a user shoots three local images, three local port information matrices are generated. Port identifiers in the fourth column of a first local port information matrix include a port identifier 1, a port identifier 2, and a port identifier 3. Port identifiers in a first column of a second local port information matrix include an identifier 1, a port identifier 2, and a port identifier 3. Port identifiers in a sixth column of the second local port information matrix include an identifier 4, a port identifier 5, and a port identifier 6. Port identifiers in a first column of a third local port information matrix include an identifier 4, a port identifier 5, and a port identifier 6. Therefore, the port identifiers in the fourth column of the first local port information matrix and the port identifiers in the first column of the second local port information matrix overlap, and the port identifiers in the first column of the third local port information matrix and the port identifiers in the sixth column of the second local port information matrix overlap. A local area corresponding to the first local port information matrix is located on the leftmost side of the optical fiber subrack, a local area corresponding to the second local port information matrix is located in the middle of the optical fiber subrack, and a local area corresponding to the third local port information matrix is located on the rightmost side of the optical fiber subrack.

After the relative location of each local area is determined, information fusion may be performed on at least two local port information matrices, and then the relative location of each communication port in the overall area is determined based on the relative location of each local area and the relative location of each communication port in the local area corresponding to each port information matrix.

For example, for the optical fiber subrack shown in FIG. 4, three local images are shot, a first local image corresponds to a local area of the first column to the fourth column, and a second local image corresponds to a local area of the fifth column to the ninth column, and the third local image corresponds to a local area of the tenth column to twelfth column. A local port information matrix corresponding to the first local image is located on the leftmost side of the overall port information matrix, and a relative location of each communication port in the overall area in the local port information matrix corresponding to the first local image does not change. A local port information matrix corresponding to the second local image is located in the middle of the overall port information matrix, a first column in the local port information matrix corresponds to a fifth column in the overall port information matrix, and a second column in the local port information matrix corresponds to a sixth column in the overall port information matrix, . . . , a fifth column in the local port information matrix corresponds to a ninth column in the overall port information matrix, and column location information of each communication port in the overall area in the local port information matrix corresponding to the second local image is column location information of each communication port in the local area plus 4, and row location information remains unchanged. A local port information matrix corresponding to the third local image is located in the rightmost of the overall port information matrix, a first column in the local port information matrix corresponds to a tenth column in the overall port information matrix, and a second column in the local port information matrix corresponds to an eleventh column in the overall port information matrix, a third column in the local port information matrix corresponds to a twelfth column in the overall port information matrix, and column location information of each communication port in the overall area in the local port information matrix corresponding to the third local image is column location information of each communication port in the local area plus 9, and row location information remains unchanged.

It should be noted that, if an overlapping area exists between the two local areas, port identifiers of repeated communication ports in the at least two local port information matrices and relative locations of the repeated communication ports in the overall area of the communication device connection panel are removed.

Figure 7:
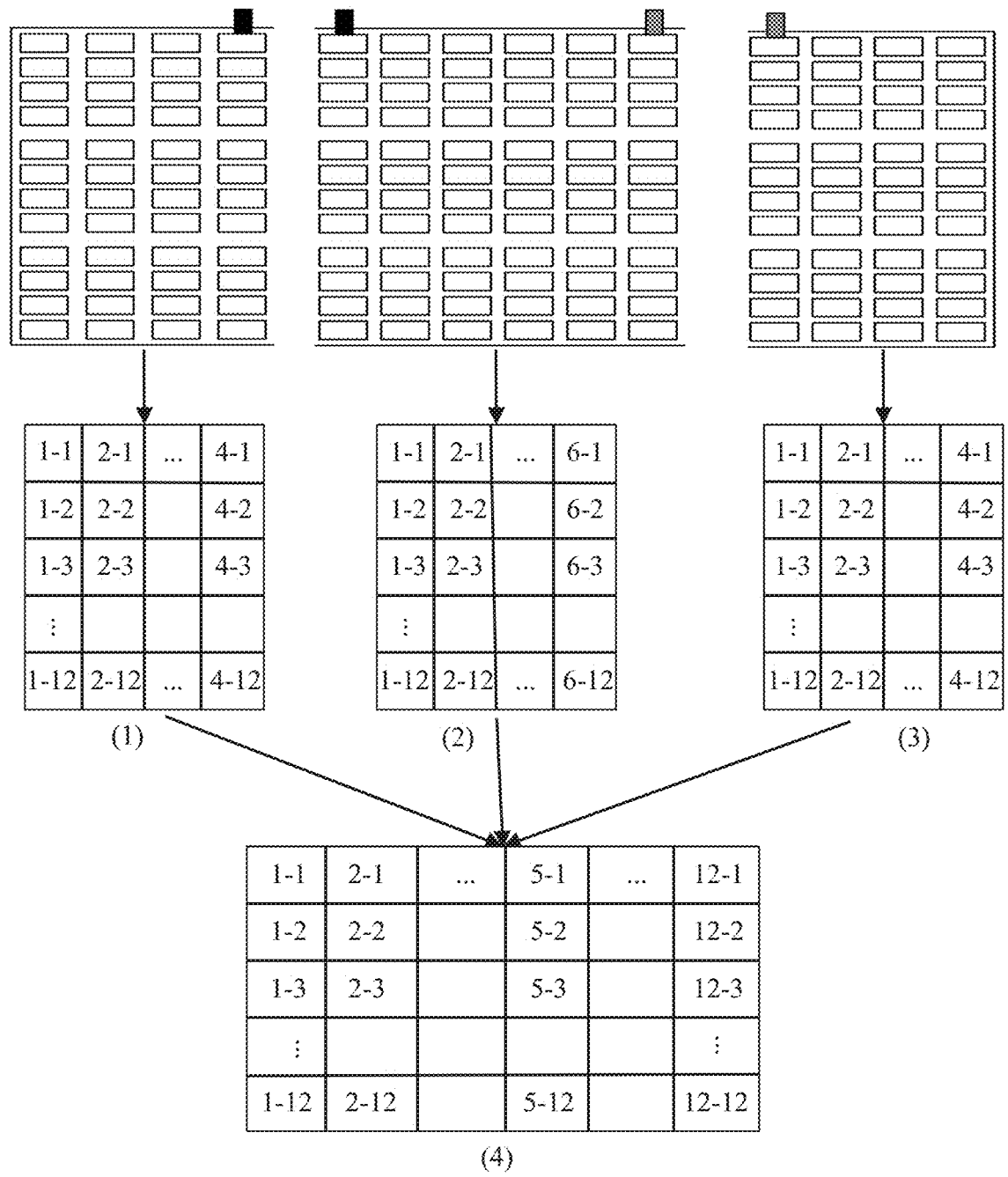
FIG. 7 is a schematic diagram of synthesizing an overall port information matrix according to an embodiment of this application.

As shown in FIG. 7, an optical fiber subrack is divided into three local areas, three local images are shot, a local port information matrix (1) is generated based on a first local image (a port identifier is not shown), and a local port information matrix (2) is generated based on a second local image, and a local port information matrix (3) is generated based on a third local image. The local port information matrices (1), (2), and (3) are combined, and a relative location of each communication in an overall area of the optical fiber subrack is re-determined (column location information changes, and row location information remains unchanged). Because a fourth column in the local port information matrix (1) and a first column in the local port information matrix (2) have duplicate information, port identifiers of repeated communication ports in the local port information matrix (1) and the local port information matrix (2) and relative locations of the repeated communication ports in the overall area of the optical fiber subrack are removed. Because a sixth column in the local port information matrix (2) and a first column in the local port information matrix (3) have duplicate information, port identifiers of repeated communication ports in the local port information matrix (2) and the local port information matrix (3) and relative locations of the repeated communication ports in the overall area of the optical fiber subrack are removed, to finally obtain an overall port information matrix (4).

S203: The electronic device performs communication port management based on the overall port information matrix. Based on the overall port information matrix, communication ports can be managed in the following ways:

In a possible implementation, an optical fiber connection between communication ports on two communication device connection panels may be established based on overall port information matrices corresponding to the two communication device connection panels. Communication is enabled through the established optical fiber connection.

In another possible implementation, a relative location of the to-be-found communication port in the communication device connection panel is presented based on a port identifier of a to-be-found communication port and the overall port information matrix. The to-be-found communication port is an idle communication port. Further, in the overall area, a relative location of a communication port whose port identifier is the same as the port identifier of the to-be-found communication port in the overall port information matrix may be presented, and the to-be-found communication port is identified as an idle communication port in the overall port information matrix.

For example, when a communication port on a communication device connection panel at one end of a user side is removed, the user needs to find an idle communication port on a communication device connection panel at an optical splitter side. That idle communication ports can be managed based on the overall port information matrix corresponding to the communication device connection panel on the optical splitter side includes: A port identifier of a removed communication port in the communication device connection panel at the user side end may be obtained, and whether the port identifier in the overall port information matrix is the same as a port identifier of a to-be-found communication port is determined, and if the port identifier in the overall port information matrix is the same as a port identifier of a to-be-found communication port, in this case, a relative location of the communication ports with the same port identifier in the overall area of the communication device connection panel on the optical splitter side are obtained from the overall port information matrix, and then the relative location of the communication port with the same port identifier in the overall area is displayed. The user may process the communication port based on the relative location of the communication port in the overall area. For example, the optical fiber is removed from the communication port on the communication device connection panel on the optical splitter side.

In this embodiment of this application, shooting the local area in the communication device connection panel improves definition of the local image, so that when the overall port information matrix of the communication device connection panel is generated based on the local image, accuracy of communication port positioning is improved. Through the overall port information matrix, the communication ports on the communication device connection panel are managed, and efficiency of the communication port management is improved.

Figure 8:
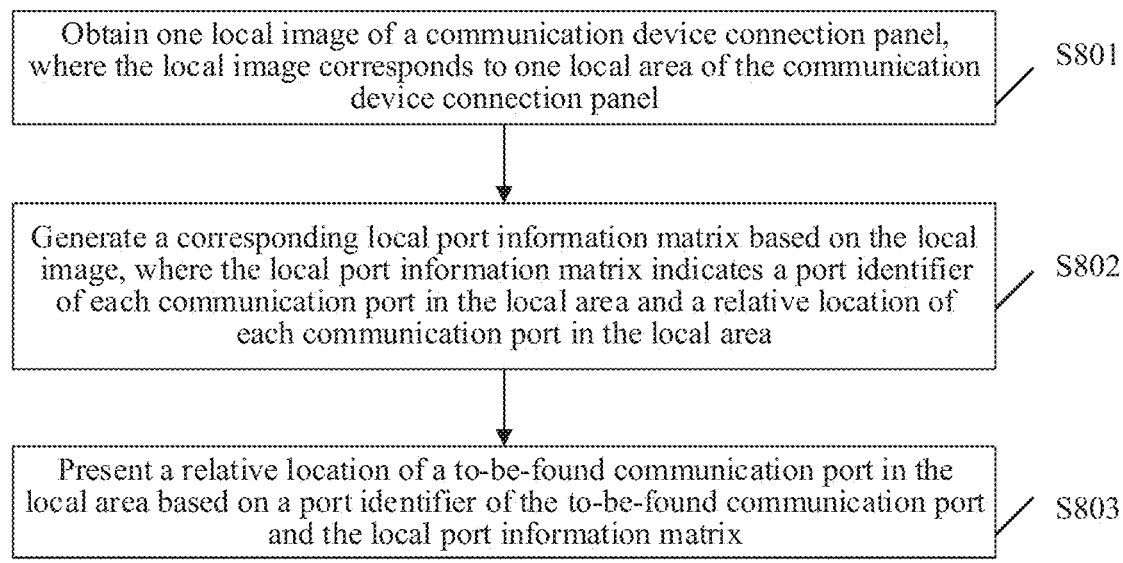
FIG. 8 is a schematic flowchart of another communication port management method according to an embodiment of this application.

As shown in FIG. 8, FIG. 8 is a schematic flowchart of another communication port management method according to an embodiment of this application. Steps in this embodiment of this application include at least the following steps.

S801: An electronic device obtains one local image of a communication device connection panel, where the local image corresponds to one local area of the communication device connection panel.

The communication device connection panel may be a communication device connection panel on an optical splitter side. For a structure of the communication device connection panel, refer to the foregoing embodiment.

Optionally, a user can add a characteristic mark on the communication device connection panel, and can fasten the characteristic mark to an edge area on the communication device connection panel, for example, a location above a first row of communication ports or a location below a last row of communication ports on the communication device connection panel, in a manner such as pasting or nesting. The characteristic mark may be different types of identification information, for example, different patterns, different color blocks, or different letters. Different local areas on the communication device connection panel can be distinguished by setting characteristic marks. The user may scan and shoot the communication device connection panel from left to right by using the electronic device, and obtain a plurality of frames of preview images for one local area. When the characteristic mark on the communication device connection panel is obtained, one local image is selected from the plurality of frames of preview images.

Optionally, if there is no characteristic mark on the communication device connection panel, the user may first divide the communication device connection panel into at least two local areas, and then align the camera with one local area in the communication device connection panel, to shoot a local image.

Optionally, during the process of shooting the communication device connection panel, the plurality of frames of preview images may be analyzed in real time to determine the imaging quality of the plurality of frames of preview images; and prompt information is displayed based on the imaging quality, where the prompt information prompts the user to control a shooting speed and a shooting distance. The imaging quality may be definition, an imaging area, or the like. Further, if definition of one or more frames of preview images is less than a first preset threshold, the user is prompted to adjust a shooting angle or reduce a moving speed of the electronic device. Alternatively, if an imaging area of one or more frames of preview images is less than a second preset threshold or greater than a third preset threshold, the user is prompted to adjust a distance between the electronic device and the communication device connection panel, so that the imaging area of the shot local images matches the local area.

Optionally, a plurality of local images are shot for one local area. One local image whose definition is greater than a preset threshold is selected from the plurality of local images, or a local image whose definition is highest is selected from the plurality of local images.

It should be noted that, a local area may be randomly selected, and a local image may be shot for analysis. If no communication port that needs to be processed is found in the selected local area, another local area is selected, and a local image is shot for analysis.

Optionally, before a local image of the communication device connection panel is obtained, the port identifier of the to-be-found communication port is obtained by scanning a port label of the to-be-found communication port on another communication device connection panel. For example, in a case in which one communication port of the communication device connection panel on a user side is removed, the user needs to find out an idle communication port on the communication device connection panel on an optical splitter side, to manage the idle communication port on the communication device connection panel on the optical splitter side. Each communication port in the communication device connection panel at one end of the user side is attached with a port label used to identify each communication port. The port label may be a QR code, a bar code, a character string, machine-readable code information, or the like. The electronic device may scan the port label of the idle communication port on the communication device connection panel at one end of the user side, and then identify the port label to determine the port identifier of the to-be-found communication port, to find the idle communication port on the communication device connection panel on the optical splitter side by using the port identifier of the to-be-found communication port.

S802: The electronic device generates a corresponding local port information matrix based on the local image, where the local port information matrix indicates a port identifier of each communication port in the local area and a relative location of each communication port in the local area.

The relative location in the local area may be a location of the communication port relative to an original point in the local area, and the origin may be an upper left corner, an upper right corner, a lower left corner, a lower right corner, or a center in the local area, or a characteristic mark in the local area.

For example, for the optical fiber subrack shown in FIG. 4, the local area of the first column to the fourth column is shot to obtain a local image. Because each communication port is attached with a port label, a port identifier of each communication port in the local image may be obtained by identifying a port identifier of each communication port. Then, a relative location of each communication port in the local area in the local area is determined by using an origin in the local area corresponding to the local image as a reference point. For example, an upper left corner in the local area is used as an origin, a communication port in a first row and a first column may be recorded as (1, 1), a communication port in a second row and a first column may be recorded as (2, 1), and a communication port in row 3 and column 1 can be recorded as (3, 1), . . . , and so on. A relative location of each communication port in the local area corresponding to the local image is recorded, and a local port information matrix is generated based on a port identifier of each communication port and the relative location of each communication port in the corresponding local area.

Optionally, before shooting the communication device connection panel, the user may enter, to the electronic device, location information of the characteristic mark on the communication device connection panel. After the local image is shot, location information of the characteristic mark on the communication device connection panel may be obtained. A local port information matrix is generated based on the location information, where a relative location of each communication port in the local area in the local port information matrix is determined based on the location information, and the location information of the characteristic marker may be column and column information of the characteristic mark in the local area.

Further, a relative location of each communication port in the local area includes column location information and row location information, and the column location information is determined based on the location information of the characteristic mark in the local area. For example, the column location information of the communication port is a quantity of columns from the distance characteristic mark to the communication port. The row location information is determined based on a distance from a first row of communication ports in the local area. For example, the row location information of the communication port is a quantity of rows from the communication port to the first row of communication ports. Alternatively, the row location information is determined based on location information of the characteristic mark in the local area, and the column location information is determined based on a distance from a first column of communication ports in the local area. Alternatively, both the column location information and the row location information may be determined based on location information of the characteristic mark in the local area, where the column location information is a quantity of columns from the communication port to the characteristic mark, and the row location information is a quantity of rows from the communication port to the characteristic mark.

Optionally, a port label of each communication port in a corresponding local area may not be fully identified based on one local image. If the local port information matrix lacks port identifiers of some communication ports and relative locations of the port identifiers in the corresponding local area, another local image may be selected from the plurality of local images (shot for a same local area). Then, a corresponding local port information matrix is regenerated based on the another local image. Based on the regenerated local port information matrix, a port identifier of a communication port that fails to be identified in the original local port information matrix and a relative location of the communication port in a corresponding local area are filled.

Optionally, if the local port information matrix does not contain port identifiers of some communication ports and relative locations of some communication ports in the corresponding local area, prompt information may be displayed, where the prompt information prompts the user to reshoot another local image. Another local image is reshot for the same local area. A corresponding local port information matrix is regenerated based on the another local image. Based on the regenerated local port information matrix, a port identifier of a communication port that fails to be identified in the original local port information matrix and a relative location of the communication port in a corresponding local area are filled.

S803: The electronic device presents a relative location of a to-be-found communication port in the local area based on a port identifier of the to-be-found communication port and the local port information matrix.

Optionally, a relative location of a communication port whose port identifier is the same as the port identifier of the to-be-found communication port in the local port information matrix is presented in the local area. Further, a port identifier of each communication port in the local port information matrix may be compared with a port identifier of the to-be-found communication port. If a port identifier of a communication port in the local port information matrix is the same as the port identifier of the to-be-found communication port, it is determined that the relative location of the to-be-found communication port in the local area is a relative location of the communication port in the local port information matrix in the local area. Finally, the relative location of the to-be-found communication port in the local area is presented.

The relative location of the to-be-found communication port in the local area includes column location information and row location information in the local area. The column location information is determined based on location information of the characteristic mark in the local area, and the row location information is determined based on a distance from a first row communication port in the local area. For example, "C9" indicates that the to-be-found communication port is in a $C^{th}$ row relative to the first row of communication ports (row A) and in a $9^{th}$ column relative to the characteristic mark in the local area. Optionally, the relative location of the to-be-found communication port in the local area may alternatively be a location of the communication port relative to an original point in the local area, and the origin may be an upper left corner, an upper right corner, a lower left corner, a lower right corner, or a center in the local area. For example, the upper left corner in the local area is used as the origin, and "B5" indicates that the to-be-found communication port is in a row B relative to the first row of communication ports (row A) and in a $5^{th}$ column relative to the first column of communication ports in the local area.

Optionally, the to-be-found communication port may be marked in a corresponding local image based on the relative location of the to-be-found communication port in the local area. When the user views the communication device connection panel, a local image marked with the to-be-found communication port is compared with a local area in the communication device connection panel, and the communication port is found in the local area in the communication device connection panel, so that the user processes the found communication port. For example, the user can remove an optical fiber from the communication port on the communication device connection panel. The to-be-found communication port may be a virtual occupied resource port or a "dumb resource" port, that is, a port that has no service but still occupies a resource of an optical splitter.

Figure 10A:
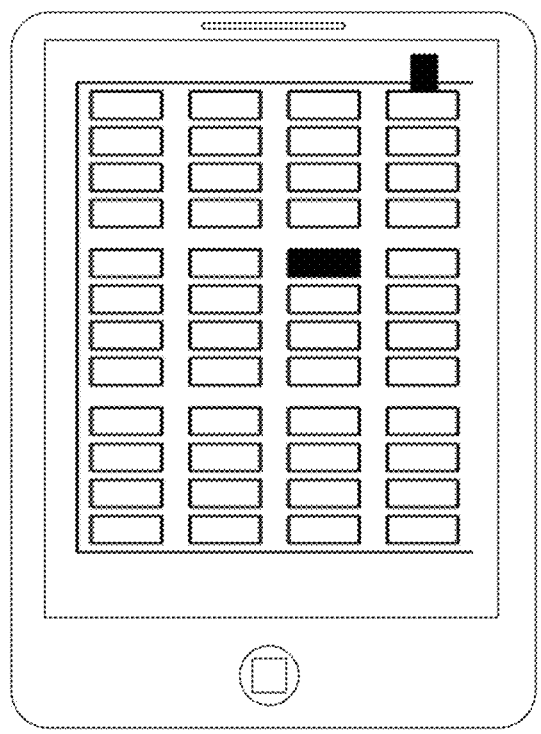
FIG. 10(A) is a schematic diagram of location display according to an embodiment of this application.
Figure 10B:
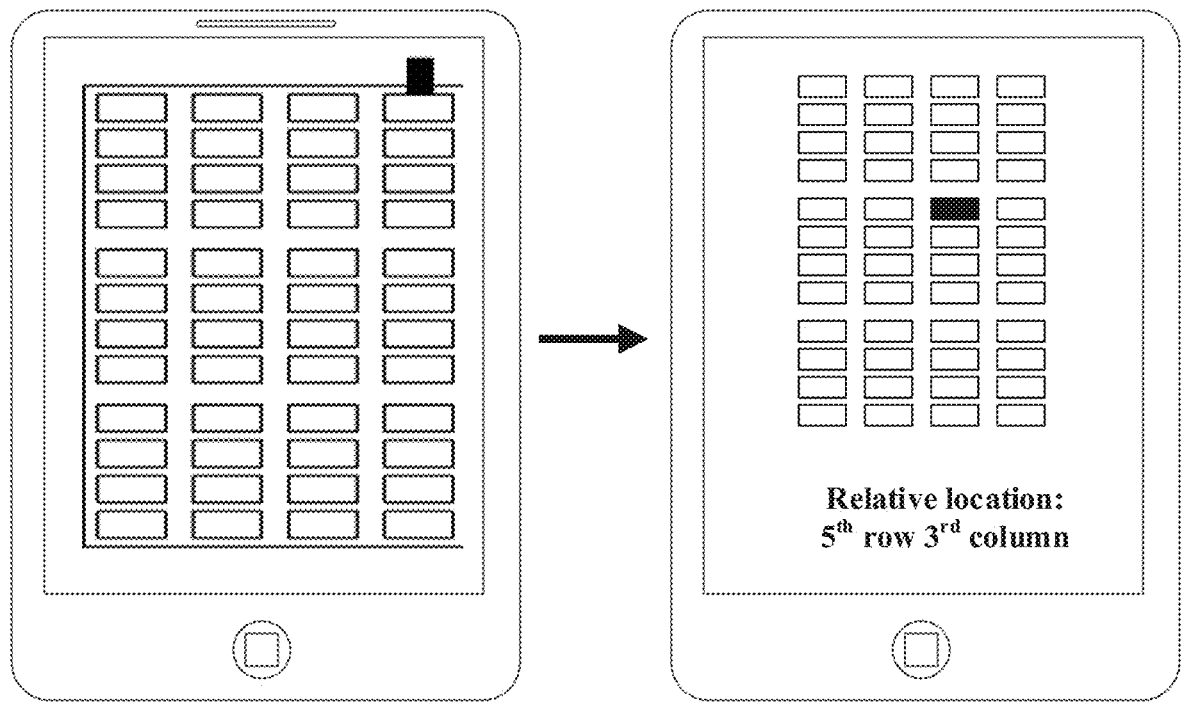
FIG. 10(B) is another schematic diagram of location display according to an embodiment of this application.

Optionally, the relative location of the to-be-found communication port in the local area is presented in a highlighting manner or in another manner. For example, as shown in FIG. 10(A), for the optical fiber subrack shown in FIG. 4, the optical fiber subrack is divided into three local areas, and three local images are respectively shot. A local port information matrix is generated based on a first local image, and it is determined that a relative location of a communication port in a local area is at a fifth row and a third column. Therefore, the communication port (marked black) may be marked with emphasis in the first local image. As shown in FIG. 10(B), a local port information matrix is generated based on the first local image, and after it is determined that the relative location of the communication port in the local area is in the fifth row and the third column, a corresponding port matrix diagram may be generated for the first local image. Each element in the port matrix diagram corresponds to each port in the first local image. In the port matrix diagram, an element at the fifth row and the third column is marked with emphasis, that is, a communication port in the fifth row and the third column in the first local image. In addition, "Relative location: $5^{th}$ row $3^{rd}$ column" can be displayed next to the port matrix diagram.

Optionally, if the relative location of the to-be-found communication port in the local area is found in the local port information matrix, shooting is immediately stopped, and the relative location of the to-be-found communication port in the local area is output. If the relative location of the to-be-found communication port in the local area is not found in the local port information matrix, it is determined that the to-be-found communication port is not in the local area, and the electronic device continues to scan and shoot a next local area, to obtain another local image, and regenerate, based on the another local image, a corresponding local port information matrix, and determine, by using the regenerated local port information matrix, whether the to-be-found communication port is in the next local area, until the relative location of the to-be-found communication port in the local area is found.

In this embodiment of this application, shooting the local area in the communication device connection panel improves definition of the local image, so that when the local port information matrix is generated based on the local image, accuracy of communication port positioning is improved, thereby improving accuracy of searching for a communication port and improving efficiency of communication port management. Moreover, information processing amount can be reduced by locating the communication port by using the local image.

It may be understood that the methods and operations implemented by the electronic device in the foregoing method embodiments may also be implemented by a component (for example, a chip or a circuit) that can be used by the electronic device. The electronic device may simulate the electronic device.

The foregoing mainly describes the solutions provided in embodiments of this application from a perspective of interaction. It may be understood that, to implement the foregoing functions, the electronic device includes a corresponding hardware structure and/or a corresponding software module for performing each function. A person skilled in the art should be aware that units and algorithm steps in the examples described with reference to the embodiments disclosed in this specification can be implemented in a form of hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In this embodiment of this application, the electronic device may be divided into function modules based on the foregoing method examples. For example, each function module may be obtained through division based on each corresponding function, or two or more functions may be integrated into one processing module. The foregoing integrated module may be implemented in a form of hardware, or may be implemented in a form of a software function module. It should be noted that, the module division in this embodiment of this application is an example, and is only logical function division there may be another feasible division manner. The following uses an example in which function modules are obtained through division corresponding to each function as an example for description.

The foregoing describes in detail the method provided in embodiments of this application with reference to FIG. 3. The following describes in detail a communication port management apparatus provided in an embodiment of this application with reference to FIG. 5. It should be understood that descriptions of apparatus embodiments correspond to the descriptions of the method embodiments. Therefore, for content that is not described in detail, refer to the foregoing method embodiments. For brevity, details are not described herein again.

Figure 9:
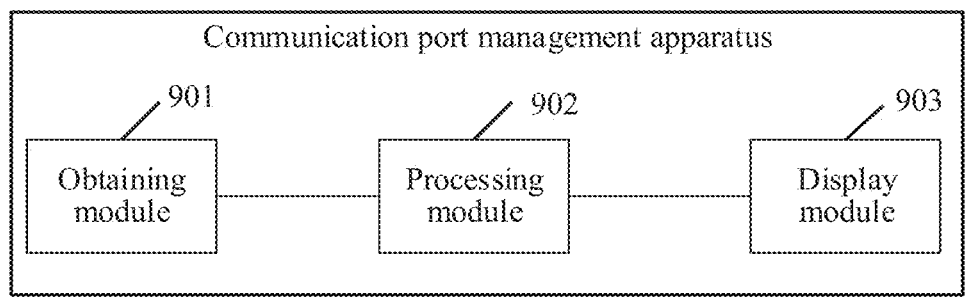
FIG. 9 is a schematic diagram of a structure of a communication port management apparatus according to an embodiment of this application.

Refer to FIG. 9. FIG. 9 is a schematic diagram of a structure of a communication port management apparatus according to an embodiment of this application. The apparatus may include an obtaining module 901, a processing module 902, and a display module 903, configured to perform actions performed by the electronic device in the foregoing method embodiments.

The communication port management apparatus may implement steps or procedures performed by the electronic device in the foregoing method embodiments. For example, the communication port management apparatus may be an electronic device, or a chip or a circuit configured in the electronic device.

In a possible implementation, the communication port management apparatus is configured to manage a plurality of communication ports on a communication device connection panel, where each of the plurality of communication ports is attached with a port label that identifies each communication port, and the apparatus includes:

an obtaining module 901, configured to obtain at least two local images of the communication device connection panel, where each local image corresponds to one local area of the communication device connection panel; and a processing module 902, configured to: generate an overall port information matrix of the communication device connection panel based on the at least two local images, where the overall port information matrix indicates a port identifier of each communication port in the plurality of communication ports and a relative location of each communication port in an overall area of the communication device connection panel; and perform communication port management based on the overall port information matrix.

Optionally, the processing module 902 is further configured to: generate a corresponding local port information matrix for each local image, to obtain at least two local port information matrices, where each local port information matrix indicates a port identifier of each communication port in a corresponding local area and a relative location of each communication port in the corresponding local area; and obtain the overall port information matrix based on the at least two local port information matrices.

Optionally, the processing module 902 is further configured to: determine a relative location of each local area, where the relative location of each local area is a relative location of a local area corresponding to each port information matrix in the communication device connection panel; and determine the relative location of each communication port in the overall area of the communication device connection panel based on the relative location of each local area and the relative location of each communication port in the local area corresponding to each port information matrix.

Optionally, the processing module 902 is further configured to determine the relative location of each local area based on a relative location that is of each local image and that is entered by a user.

Optionally, the processing module 902 is further configured to determine the relative location of each local area based on identification information of the at least one characteristic mark.

Optionally, the processing module 902 is further configured to determine the relative location of each local area based on a relative location that is of the at least one characteristic mark in the overall area and that is entered by a user.

Optionally, the processing module 902 is further configured to determine the relative location of each local area based on an arrangement characteristic of a port identifier in each local port information matrix.

An overlapping area exists between a local area corresponding to a first local image and a local area corresponding to a second local image in the at least two local images.

Optionally, the processing module 902 is further configured to remove port identifiers of repeated communication ports in the at least two local port information matrices and relative locations of the repeated communication ports in the overall area of the communication device connection panel.

Optionally, the obtaining module 901 is further configured to obtain a plurality of frames of preview images of the communication device connection panel; and the processing module 902 is further configured to: when the characteristic mark is detected, select, from the plurality of frames of preview images, one local image in which the characteristic mark can be recognized.

Optionally, the processing module 902 is further configured to: determine imaging quality of the plurality of frames of preview images in a process of shooting the communication device connection panel; and prompt information is displayed based on the imaging quality, where the prompt information prompts the user to control a shooting speed and a shooting distance.

Optionally, the display module 903 is further configured to present a relative location of a to-be-found communication port in the communication device connection panel based on a port identifier of the to-be-found communication port and the overall port information matrix.

Optionally, the to-be-found communication port is an idle communication port, and the processing module 902 is further configured to identify the to-be-found communication port as an idle communication port in the overall port information matrix.

Optionally, the relative location of each communication port in the overall area of the communication device connection panel includes row location information and column location information of each communication port in the overall area of the communication device connection panel.

Optionally, the processing module 902 is further configured to: shoot a plurality of local images for each local area; and select, from the plurality of local images, one first local image whose definition is greater than a preset threshold.

Optionally, the processing module 902 is further configured to: reselect a second local image from the plurality of local images; regenerate a corresponding local port information matrix based on the second local image; and fill, based on the regenerated local port information matrix, a port identifier of a communication port that fails to be identified in a corresponding local port information matrix generated based on the first local image and a relative location of the communication port in a corresponding local area.

Optionally, the display module 903 is configured to display prompt information, where the prompt information prompts the user to reshoot a second local image; and the processing module 902 is further configured to: reshoot a second local image for the local area corresponding to the first local image; regenerate a corresponding local port information matrix based on the second local image; and fill, based on the regenerated local port information matrix, a port identifier of a communication port that fails to be identified in a corresponding local port information matrix generated based on the first local image and a relative location of the communication port in a corresponding local area.

In another possible implementation, the communication port management apparatus is configured to search for a communication port on a communication device connection panel, where each communication port on the communication device connection panel is attached with a port label that identifies each communication port, and includes:

an obtaining module 901, configured to obtain one local image of the communication device connection panel, where the local image corresponds to one local area of the communication device connection panel;

a processing module 902, configured to generate a corresponding local port information matrix based on the local image, where the local port information matrix indicates a port identifier of each communication port in the local area and a relative location of each communication port in the local area; and a display module 903, configured to present a relative location of a to-be-found communication port in the local area based on a port identifier of the to-be-found communication port and the local port information matrix.

Optionally, the display module 903 is further configured to present a relative location, in the local area, of a communication port whose port identifier is the same as the port identifier of the to-be-found communication port in the local port information matrix.

Optionally, the processing module 902 is further configured to compare a port identifier of each communication port in the local port information matrix with a port identifier of the to-be-found communication port; and if a port identifier of a communication port in the local port information matrix is the same as the port identifier of the to-be-found communication port, determine that the relative location of the to-be-found communication port in the local area is a relative location of the communication port in the local port information matrix in the local area; and the display module 903 is further configured to present the relative location of the to-be-found communication port in the local area.

Optionally, the obtaining module 901 is further configured to obtain the port identifier of the to-be-found communication port by scanning a port label of the to-be-found communication port on another communication device connection panel.

Optionally, the communication device connection panel is attached with at least one characteristic mark; and the obtaining module 901 is further configured to shoot one local image for the local area based on the characteristic mark on the communication device connection panel.

Optionally, the relative location of the to-be-found communication port in the local area includes column location information and row location information in the local area.

Optionally, the column location information is determined based on the location information of the characteristic mark in the local area, and the row location information is determined based on a distance from a first row communication port in the local area.

Optionally, the display module 903 is further configured to present the relative location of the to-be-found communication port in the local area in a highlighting manner.

It should be noted that, for implementation of each module, refer to corresponding descriptions in the method embodiments shown in FIG. 2 and FIG. 8. The methods and functions performed by the electronic device in the foregoing embodiments are performed.

An embodiment of this application further provides a chip system. The chip system includes a processor, configured to support an electronic device to implement a function in any one of the foregoing embodiments, for example, generating or processing a parasitic resistance and capacitance parameter in the foregoing method. In a possible design, the chip system may further include a memory, and the memory is used for program instructions and data that are necessary for the electronic device. The chip system may include a chip, or may include a chip and another discrete component. Input and output of the chip system are respectively corresponding to receiving and sending operations of the electronic device in the method embodiments.

An embodiment of this application further provides a processing apparatus, including a processor and a communication interface. The processor may be configured to perform the methods in the foregoing method embodiments.

It should be understood that the foregoing processing apparatus may be a chip. For example, the processing apparatus may be a field programmable gate array (FPGA), an application-specific integrated chip (ASIC), a system on chip (SoC), a central processing unit (CPU), a network processor (NP), a digital signal processor (DSP) circuit, a micro controller unit (MCU), a programmable controller (PLD), or another integrated chip.

In an implementation process, steps in the foregoing methods can be implemented by using a hardware integrated logical circuit in the processor, or by using instructions in a form of software. Steps of the methods disclosed with reference to embodiments of this application may be directly performed and completed by a hardware processor, or may be performed and completed by using a combination of hardware and software modules in the processor. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor. To avoid repetition, details are not described herein again.

It should be noted that the processor in this embodiment of this application may be an integrated circuit chip, and has a signal processing capability. In an implementation process, steps in the foregoing method embodiments can be implemented by using a hardware integrated logical circuit in the processor, or by using instructions in a form of software. The processor may be a general purpose processor, a digital signal processor (DSP), an application-specific integrated circuit (ASIC), a field programmable gate array (FPGA) or another programmable logic device, a discrete gate or a transistor logic device, or a discrete hardware component. It may implement or perform the methods, the steps, and logical block diagrams that are disclosed in embodiments of this application. The general-purpose processor may be a microprocessor, or the processor may be any conventional processor or the like. Steps of the methods disclosed with reference to embodiments of this application may be directly performed and completed by using a hardware decoding processor, or may be performed and completed by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

According to the methods provided in embodiments of this application, this application further provides a computer program product. The computer program product includes: a computer program, and when the computer program runs on a computer, the computer performs the method in any one of the embodiments shown in FIG. 2 and FIG. 8.

According to the methods provided in embodiments of this application, this application further provides a computer-readable medium. The computer-readable medium stores a computer program. When the computer program is run on a computer, the computer performs the method in any one of the embodiments shown in FIG. 2 and FIG. 8.

All or a part of the foregoing embodiments may be implemented by software, hardware, firmware, or any combination thereof. When software is used to implement the embodiments, all or a part of the embodiments may be implemented in a form of a computer program product. The computer program product includes one or more computer instructions. When the computer instructions are loaded and executed on a computer, the procedures or functions according to embodiments of this application are all or locally generated. The computer may be a general-purpose computer, a dedicated computer, a computer network, or any other programmable apparatus. The computer instructions may be stored in a computer-readable storage medium or transmitted from one computer-readable storage medium to another computer-readable storage medium. For example, the computer instructions may be transmitted from one network site, computer, server or data center to another network site, computer, server or data center in a wired (such as coaxial cable, optical fiber, or digital subscriber line (DSL)) or wireless (such as infrared, wireless, or microwave) manner. The computer-readable storage medium may be any usable medium accessible by the computer, or a data storage device, such as a server or a data center, integrating one or more usable media. The available medium may be a magnetic medium (for example, a floppy disk, a hard disk, or a magnetic tape), an optical medium (for example, high-density digital video disc (DVD)), or a semiconductor medium (for example, a solid-state drive (SSD)), and the like.

What is claimed is:

1. A communication port management method, used to manage a plurality of communication ports on a communication device connection panel, wherein the method comprises:
   obtaining at least two images of the communication device connection panel, wherein each image corresponds to one sub-panel of the communication device connection panel, wherein each sub-panel of the communication device connection panel comprises one or more communication ports of the plurality of communication ports, and wherein each of the plurality of communication ports is attached with a physical port label that identifies each communication port;
   generating a port information matrix corresponding to each image to obtain at least two port information matrices, wherein each port information matrix indicates a port identifier of each communication port in a sub-panel corresponding to the port information matrix and a location of each communication port in the sub-panel;
   determining a location of each sub-panel relative to the communication device connection panel to obtain at least two sub-panel locations;
   generating an overall port information matrix of the communication device connection panel based on the at least two port information matrices and the at least two sub-panel locations, wherein the overall port information matrix indicates a port identifier of each communication port in the plurality of communication ports and a location of each communication port in the communication device connection panel; and
   performing communication port management based on the overall port information matrix.

2. The method according to claim 1, wherein generating the overall port information matrix based on the at least two port information matrices and the at least two sub-panel locations comprises:
   determining the location of each communication port in the communication device connection panel based on the at least two sub-panel locations and the location of each communication port in the sub-panel.

3. The method according to claim 2, wherein the determining a location of each sub-panel comprises:
   determining the location of each sub-panel based on a location of each image, wherein the location of each image is entered by a user.

4. The method according to claim 2, wherein the communication device connection panel is physically attached with at least one characteristic mark, and the determining a location of each sub-panel comprises:
   determining the location of each sub-panel based on identification information of the at least one characteristic mark.

5. The method according to claim 2, wherein the communication device connection panel is attached with at least one characteristic mark, and the determining a location of each sub-panel comprises:
   determining the location of each sub-panel based on a location of the at least one characteristic mark in the communication device connection panel, wherein the location of the at least one characteristic mark is entered by a user.

6. The method according to claim 2, wherein the determining a location of each sub-panel comprises:
   determining the location of each sub-panel based on one or more port identifiers in each port information matrix.

7. The method according to claim 1, wherein an overlapping area exists between an area corresponding to a first image and an area corresponding to a second image in the at least two images.

8. The method according to claim 7, wherein generating the overall port information matrix based on the at least two port information matrices and the at least two sub-panel locations comprises:
   removing port identifiers of repeated communication ports in the at least two port information matrices and locations of the repeated communication ports in the communication device connection panel, wherein the repeated communication ports are in the overlapping area.

9. The method according to claim 1, wherein the communication device connection panel is attached with at least one characteristic mark, and the obtaining at least two images of the communication device connection panel comprises:
   obtaining a plurality of frames of preview images of the communication device connection panel; and
   in response to detecting a characteristic mark, selecting, from the plurality of frames of preview images, one image in which the characteristic mark is recognizable by an electronic device.

10. The method according to claim 9, wherein the obtaining a plurality of frames of preview images of the communication device connection panel comprises:
    determining imaging quality of the plurality of frames of preview images captured by a camera in a process of shooting the communication device connection panel; and
    displaying prompt information based on the imaging quality, wherein the prompt information prompts a user to control a shooting speed and a shooting distance of the camera.

11. The method according to claim 1, wherein the obtaining at least two images of the communication device connection panel comprises:
    shooting, using a camera, a plurality of images for each sub-panel; and
    selecting, from the plurality of images, one image whose definition is greater than a preset threshold.

12. A communication port management apparatus, configured to manage a plurality of communication ports on a communication device connection panel, wherein the apparatus comprises:
- at least one processor; and
- one or more memories coupled to the at least one processor and storing programming instructions for execution by the at least one processor to:
  - obtain at least two images of the communication device connection panel, wherein each image corresponds to one sub-panel of the communication device connection panel, wherein each sub-panel of the communication device connection panel comprises one or more communication ports of the plurality of communication ports, and wherein each of the plurality of communication ports is attached with a physical port label that identifies each communication port;
  - generate a port information matrix corresponding to each image to obtain at least two port information matrices, wherein each port information matrix indicates a port identifier of each communication port in a sub-panel corresponding to the port information matrix and a location of each communication port in the sub-panel;
  - determine a location of each sub-panel relative to the communication device connection panel to obtain at least two sub-panel locations;
  - generate an overall port information matrix of the communication device connection panel based on the at least two port information matrices and the at least two sub-panel locations, wherein the overall port information matrix indicates a port identifier of each communication port in the plurality of communication ports and a location of each communication port in the communication device connection panel; and
  - perform communication port management based on the overall port information matrix.

13. The apparatus according to claim 12, wherein the programming instructions are for execution by the at least one processor to:
- determine the location of each communication port in the communication device connection panel based on the at least two sub-panel locations and the location of each communication port in the sub-panel.

14. The apparatus according to claim 12, wherein an overlapping area exists between an area corresponding to a first image and an area corresponding to a second image in the at least two images.

15. The apparatus according to claim 12, wherein the communication device connection panel is attached with at least one characteristic mark, wherein the programming instructions are for execution by the at least one processor to:
- obtain a plurality of frames of preview images of the communication device connection panel; and
- in response to detecting a characteristic mark, select, from the plurality of frames of preview images, one image in which the characteristic mark is recognizable by an electronic device.

16. The apparatus according to claim 15, wherein the programming instructions are for execution by the at least one processor to:
- determine imaging quality of the plurality of frames of preview images captured by a camera in a process of shooting the communication device connection panel; and
- display prompt information based on the imaging quality, wherein the prompt information prompts a user to control a shooting speed and a shooting distance of the camera.

17. The apparatus according to claim 12, wherein the programming instructions are for execution by the at least one processor to:
- shoot, using a camera, a plurality of images for each sub-panel; and
- select, from the plurality of images, one image whose definition is greater than a preset threshold.

18. The apparatus according to claim 12, wherein determining the location of each sub-panel comprises:
- determining the location of each sub-panel based on a location of each image, wherein the location of each image is entered by a user.

19. The apparatus according to claim 12, wherein the communication device connection panel is physically attached with at least one characteristic mark, and wherein determining the location of each sub-panel comprises:
- determining the location of each sub-panel based on identification information of the at least one characteristic mark.

20. A non-transitory computer-readable medium storing programming instructions for execution by at least one processor, that when executed by the at least one processor, cause a computer to perform operations comprising:
- obtaining at least two images of a communication device connection panel, wherein each local image corresponds to one sub-panel of the communication device connection panel, wherein the communication device connection panel comprises a plurality of communication ports, wherein each sub-panel of the communication device connection panel comprises one or more communication ports of the plurality of communication ports, and wherein each of the plurality of communication ports is attached with a physical port label that identifies each communication port;
- generating a port information matrix corresponding to each image to obtain at least two port information matrices, wherein each port information matrix indicates a port identifier of each communication port in a sub-panel corresponding to the port information matrix and a location of each communication port in the sub-panel;
- determining a location of each sub-panel relative to the communication device connection panel to obtain at least two sub-panel locations;
- generating an overall port information matrix of the communication device connection panel based on the at least two port information matrices and the at least two sub-panel locations, wherein the overall port information matrix indicates a port identifier of each communication port in the plurality of communication ports and a relative location of each communication port in the communication device connection panel; and
- performing communication port management based on the overall port information matrix.

* * * * *

UNITED STATES PATENT AND TRADEMARK OFFICE
CERTIFICATE OF CORRECTION

Page 1 of 1

PATENT NO. : 12,261,745 B2
APPLICATION NO. : 18/485768
DATED : March 25, 2025
INVENTOR(S) : Yang Yu, Qinxian Lin and Yida Wen It is certified that error appears in the above-identified patent and that said Letters Patent is hereby corrected as shown below:

In the Claims

In Column 38, In Line 58, In Claim 20, after "a" delete "relative".

Signed and Sealed this
Twenty-second Day of July, 2025

Coke Morgan Stewart
*Acting Director of the United States Patent and Trademark Office*